(12) United States Patent
Koh et al.

(10) Patent No.: US 7,085,445 B2
(45) Date of Patent: Aug. 1, 2006

(54) MICRO-OPTO-ELECTRO-MECHANICAL WAVEGUIDE SWITCHES

(76) Inventors: Seungug Koh, 221 Duran Ter., Sunnyvale, CA (US) 94086; Danjin Wu, 221 Duran Ter., Sunnyvale, CA (US) 94086

( * ) Notice: Subject to any disclaimer, the term of this patent is extended or adjusted under 35 U.S.C. 154(b) by 78 days.

(21) Appl. No.: 10/603,004

(22) Filed: Jun. 24, 2003

(65) Prior Publication Data
US 2004/0264847 A1 Dec. 30, 2004

Related U.S. Application Data

(63) Continuation of application No. 09/635,043, filed on Aug. 4, 2000, now abandoned.

(51) Int. Cl.
*G02B 6/26* (2006.01)
(52) U.S. Cl. .............................. 385/22; 385/16; 385/20
(58) Field of Classification Search .................. 385/14, 385/16–24, 49; 359/872–874; 398/47–57
See application file for complete search history.

(56) References Cited

U.S. PATENT DOCUMENTS

| | | | |
|---|---|---|---|
| 4,955,686 A | | 9/1990 | Buhrer et al. |
| 5,024,500 A | * | 6/1991 | Stanley et al. ................ 385/16 |
| 5,144,637 A | * | 9/1992 | Koch et al. .................... 372/50 |
| 5,416,861 A | | 5/1995 | Koh et al. |
| 5,694,499 A | | 12/1997 | Tillerot et al. |
| 5,761,350 A | | 6/1998 | Koh |
| 5,832,149 A | | 11/1998 | Omizu et al. |
| 5,867,617 A | * | 2/1999 | Pan et al. ...................... 385/18 |
| 5,892,862 A | | 4/1999 | Kidder et al. |
| 5,920,665 A | | 7/1999 | Presby |
| 5,923,798 A | | 7/1999 | Aksyuk et al. |
| 5,926,588 A | | 7/1999 | Murakami et al. |
| 6,169,827 B1 | * | 1/2001 | Holman et al. ................ 385/22 |
| 6,195,478 B1 | * | 2/2001 | Fouquet ........................ 385/17 |
| 6,219,472 B1 | * | 4/2001 | Horino et al. ................. 385/16 |
| 6,363,183 B1 | * | 3/2002 | Koh ............................. 385/19 |

OTHER PUBLICATIONS

Martin Hoffman et al., "Optical Fiber Switches Based on Full Wafer Silicon Micromachining," Proceeding:MME 98-Micromechanics Europe, Ulvik, Norway, pp. 96499, 1998.

(Continued)

*Primary Examiner*—Phan T. H. Palmer

(57) ABSTRACT

As the traffic volume carried by telecommunication networks has been rapidly increased as a result of the bandwidth-intensive applications such as Internet access, electronic commerce, multimedia applications, and distributed computing, it is imperative to utilize the optical network for backbone, metropolitan, and local area networks. The optical networks employing optical fibers as the transmission medium have exhibited a superior performance/cost ratio for both long-haul and short-haul routes and the emerging dense wavelength division multiplexing (DWDM)/all-optical networks have shown a promising potential to improve speed, capacity and connectivity of optical telecommunication networks. The present invention provides Micro-Opto-Electro-Mechanical Waveguide Switch (MOEM-WS) by integrating MEMS actuators and micromachined PLCs on the same substrate. The MOEM-WS is an integrated hybrid microsystem: Micro-Opto-Electro-Mechanical System (MOEMS) and it is particularly applicable for optical cross-connect (OXC) switches and optical add/drop multiplexers (OADM). The MOEM-WS can provide an essential fiber switching capability for DWDM/all-optical networks with numerous accompanying benefits such as low cost, small crosstalk, reliability, compactness, high speed, reconfigurability, modularity, scalability, and insensitiveness to signal wavelength and polarization.

30 Claims, 16 Drawing Sheets

OTHER PUBLICATIONS

C. Marxer et al., "Reflective Modulators and By-Pass-Switches: two MEMS Components for Fiber Optic Communication," 1998 IEEE Summer Topical Meetings, Monterey, CA, pp. 27-28, 1998.

Q. Lai et al., "Low-Power Compact 2X2 Thermooptic Silica-on-Silicon Waveguide Switch with Fast Response" IEEE Photonics Technology Letters, vol. 10, No. 5, pp. 681-683, May 1998.

R. Moosburger et al., "4X4 Digital Optical Matrix Switch Using Polymeric Oversized Rib Waveguides," IEEE Photonics Technology Letters (PTL), vol. 10, No. 5, pp. 684-686, May 1998.

C.G.P. Herben et al., "A Compact Integrated InP-Based Single-Phasar Optical Crossconnect," IEEE PTL, vol. 10, No. 5, pp. 678-680, May 1998.

Takashi Goh et al., "High-Extinction Ratio and Low-Loss Silica-Based 8X8 Thermooptic Matrix Switch," IEEE PTL, vol. 10, No. 3, pp. 358-360, Mar. 1998.

Takashi Goh et al., "Low-Loss and High-Extinction Ratio Silica-Based Strictly Nonblocking 16X16 Thermooptic Matrix Switch," IEEE PTL, vol. 10, No. 6, pp. 810-812, Jun. 1998.

Jane M. Simmons et al., "Optical Crossconnects of Reduced Complexity for WDM Networks with Bidirectional Symmetry," IEEE PTL, vol. 10, No. 6, pp. 819-821, Jun. 1998.

Chuan Pu et al., "Surface Micromachined Integrated Optic Polarization Beam Splitter," IEEE PTL, vol. 10, No. 7, pp 988-990 Jul. 1998.

B. Barber et al., "A Fiber Connectorized MEMS Variable Optical Attenuator," IEEE PTL, vol. 10, No. 9, pp. 1262-1264, Sep. 1998.

L.Y. Lin et al., "High-Density Micromachined Polygon Optical Crossconnects Exploiting Network Connection Symmetry," IEEE PTL, vol. 10, No. 10, pp. 1425-1427, Oct. 1998.

Cronel Marxer et al., "A Variable Optical Attenuator Based on Silicon Micromechanics," IEEE PTL, vol. 11, No. 2, pp. 233-235, Feb. 1999.

Neil A. Jackman et al., "Optical Cross Connects for Optical Networking," Bell Labs Technical Journal, pp. 262-281, Jan.-Mar. 1999.

D. Bruce Buchholz et al., "Broadband Fiber Access: A Fiber-to-the-Customer Access Architecture," Bell Labs Technical Journal, pp. 282-299, Jan.-Mar. 1999.

C. Randy Giles et al., "The Wavelength Add/Drop Multiplexer for Lightwave Communication Networks," Bell Labs Technical Journal, pp. 207-229, Jan.-Mar. 1999.

Masayuki Okuno et al., "Silica-Based 8X8 Optical Matrix Switch Integrating New Switching Units with Large Fabrication Tolerance," IEEE/OSA JLT, vol. 143, No. 5, pp. 771-779, May 1999.

Y.P. Li et al., "Silica-based optical integrated circuits," IEE Proceedings-Optoelectron, vol. 143, No. 5, pp. 263-280, Oct. 1996.

M. Kawachi, "Recent progress in silica-based planar lightwave circuits on silicon," IEE Proceedings-Optoelectron, vol. 143, No. 5, pp. 257-262, Oct. 1996.

C.A. Jones et al., "Hybrid integration onto silicon motherboards with planar silica waveguides," IEE Proceedings-Optoelectron, vol. 143, No. 5, Oct. 1996.

Cornel Marxer et al., "Vertical Mirrors Fabricated by Deep Reactive Ion Etching for fiber-Optic Switching Applications," IEEE/ASME Journal of MEMS, vol. 6, No. 3, pp. 277-284, Sep. 1997.

Wen-Han Huan et al., "Released Si Microstructures Fabricated by Deep Etching andShallow Diffusion," IEEE/ASME Journal of MEMS, vol. 5, No. 1, pp. 18-23, Mar. 1996.

Wen-Han Juan et al., "High-Aspect-Ratio Si Vertical Micromirror Arrays for Optical Switching," IEEE/ASME journal of MEMS, vol. 7, No. 2, pp. 207-213, Jun. 1998.

Wen-Han Juan et al., "Controlling sidewall smoothness for micro-machined Si Mirrors and lenses," AVS Journal of Vacuum Science and Technology-B, vol. 14, No. 6, pp. 4080-4084, Nov./Dec. 1996.

Yogesh B. Gianchandani, "A Bulk Silicon Dissolved Wafer Process for Microelectromechanical Devices," IEEE/ASME Journal of MEMS, vol. 1, No. 2, pp. 77-85, Jun. 1992.

William C. Tang et al.,"Electrostatic Comb Drive Levitation and Control Method," IEEE/ASME Journal of MEMS, vol. 1, No. 4, pp. 170-178, Dec. 1992.

Kuniharu Kato et al., "Packaging of Large-Scale Planar Lightwave Circuits," IEEE Transaction on Components, Packaging, and Manufacturing Tech-PartB, vol. 21, No. 2, pp 121-129, May 1998.

Seungug Koh et al., "Optoelectronic multichip modules for high-speed computer systems and communication networks," SPIE Optical Engineering, vol. 36, No. 5, pp. 1319-1325, May 1997.

Seungug Koh et al., "Synchronous global clock distribution on Multichip modules using optical waveguides," SPIE Optical Engineering, vol. 33, No. 5, pp. 1587-1595, May 1994.

* cited by examiner

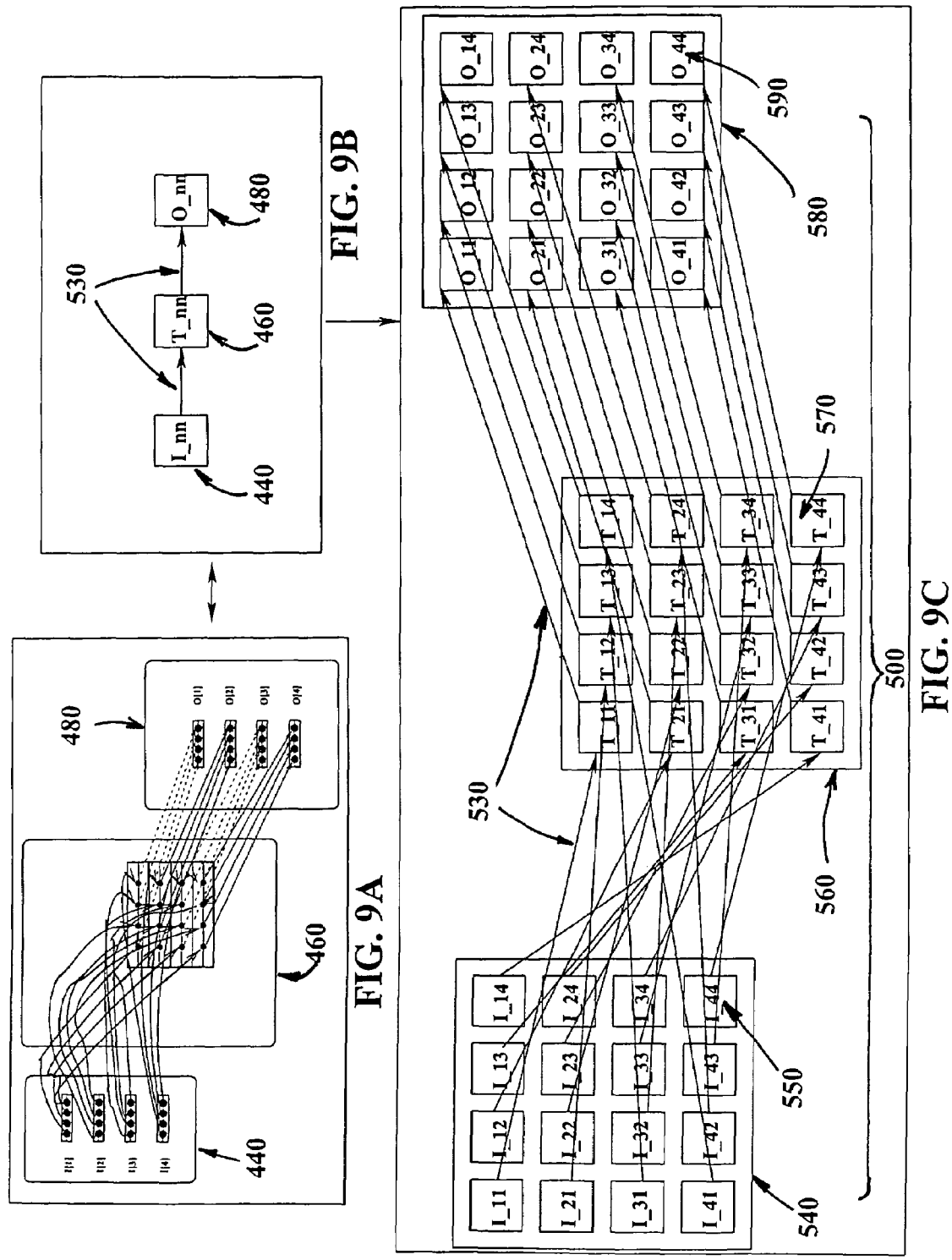

MICRO-OPTO-ELECTRO-MECHANICAL WAVEGUIDE SWITCHES

CROSS REFERENCE TO RELATED APPLICATION

This application is a continuation of U.S. patent application Ser. No. 09/635,043, filed Aug. 4, 2000, now abandoned.

TECHNICAL FILED

The present invention relates generally to Micro-Opto-Electro-Mechanical Waveguide Switches (MOEM-WS) that contain both micro electromechanical actuators and micromachined optical waveguide networks on the planar lightwave circuit (PLC) platform. And it is particularly applicable to components and devices for the next-generation dense wavelength division multiplexing (DWDM) optical networks such as optical cross-connect (OXC) switches and optical add/drop multiplexers (OADM). The invention is specifically disclosed as MOEM-WS that fabricates and integrates both micro electromechanical actuators and high-bandwidth waveguide networks on the PLCs by using well-established lithographic batch processing techniques.

BACKGROUND OF THE INVENTION

Over the past several years, the rapidly increasing traffic volumes carried by telecommunication networks have been clearly observed as a result of the bandwidth-intensive applications such as Internet access, electronic commerce, multimedia applications, and distributed computing. Optical telecommunication systems employing optical fibers as the transmission medium have exhibited a superior performance/cost ratio for both long-haul and short-haul routes compared to any other type of telecommunication systems. In particular the emerging dense wavelength-division multiplexing (DWDM) and all-optical network communication systems have shown a way to provide high-speed and large-bandwidth network services at low cost for both long-haul and metropolitan networks. As the DWDM networks are deployed, it becomes necessary to improve the delay, bandwidth, and connectivity of optical telecommunication networks, as the information system's subscriber growth continues unrestrained.

Although telecommunication service providers have increasingly deployed fiber optic cables for both long-haul and short-haul routes, the ever-increasing network traffic has created some constraints on communication network in terms of speed, capacity, and connectivity of networks. Telecommunication service providers generally address these speed, capacity and connectivity constraints by either installing new fiber cables or by expanding the transmission capacity using faster devices or DWDM techniques. The formal method is quite expensive and difficult, as it requires a huge investment as well as constant upgrade of the existing fiber network infrastructures. In the latter methods, the DWDM increases the number of optical signals, called channels, transmitted simultaneously on a single fiber, whereas the time-division multiplexing (TDM) increases the transmission speed of optical signals. The DWDM is ideal for high-capacity networks such as point-to-point or backbone ring networks with minimal switching and routing requirements. However, in the emerging DWDM metropolitan and local area networks, the major concern is not the network capacity but the reconfigurable network connectivity. In any way, for both DWDM and TDM methods, the fiber optic switching will become a major issue for optical telecommunication systems. Ever since the fiber optic telecommunication technology was first available, many network managers preferred all-optical network due to its benefits in terms of bandwidth, security, and segment length. The OXC networks can also improve the efficiency of all-optical network by providing a "transparency" to modulation format, protocol and signal bit rates. Without the all-optical networks, the signals of telecommunication networks must be converted from optical to electrical form at switching ports and the routing information in the information packet should be analyzed and utilized for a propel signal routing. Then the signal must be converted to the optical form for a subsequent signal routing and transmission. These optical-to-electrical and optical-to-electrical signal form conversions reduce the over-all network efficiencies as it introduces delays and noises.

It is widely believed that the DWDM network is an enabling technology for Internet applications, as the expectations of the Internet's great potential will not be realized without the bandwidth gain provide by DWDM. Direct fiber optic switching without electrical-to-optical or optical-to-electrical conversions is much needed for the all-optical DWDM network. The unprecedented record of growth being generated by Internet traffic and a tremendous amount of data being dumped on the public network show no sign of slowing yet. Without optical telecommunication network and optical fiber's enormous bandwidth potential, the Internet performance will be significantly slowed as the subscriber growth increases unrestrained. Notably there is a need for fiber optic switches for all-optical DWDM networks, which can provide low cost, small crosstalk, reliable, compact, reconfigurable, modular, scalable, high speed, and wavelength/polarization insensitive characteristics.

SUMMARY OF THE INVENTION

Accordingly, it is a primary objective of the present invention to provide Micro-Opto-Electro-Mechanical Waveguide Switches (MOEM-WS). The MOEM-WS can deliver integrated, reliable, compact, modular, scalable, low cost, small crosstalk, and wavelength/polarization insensitive fiber switching by integrating microelectromechanical system (MEMS) actuators and micromachined planar lightwave circuit (PLC) networks.

It is another objective of the present invention to provide a method of constructing MOEM-WS, which can seamlessly integrate MEMS actuators and micromachined PLCs at the micro scale.

It is yet another objective of the present invention to provide a method of constructing 1-input/N-output (1×N) fiber switches or N-input/1-output (N×1) fiber switches by using MOEM-WS.

Another objective of the present invention is to provide a method of constructing reconfigurable, non-blocking, and scalable Micro-Opto-Electro-Mechanical cross-connect (MOEM-XC) switches by using arrays of MOEM-WS and fiber transpose block cross-connecting the MOEM-WS arrays.

It is a further objective of the present invention to provide a method of constructing full-duplex fiber switch with a micromachined PLC having a pair of waveguide channels at both sender and receiver waveguide ports to allow bi-directional and full-duplex signal transmission.

It is yet a further objective of the present invention to provide a method of a 2-input/2-output crossbar fiber switch by using MOEM-WS.

It is yet another further objective of the present invention to provide hierarchical matrix architecture of fiber transpose blocks for a large-scale MOEM-XC switch.

Additional objectives, advantages and other novel features of the invention will be set forth in part in the description that follows and in part will become apparent to those skilled in the art upon examination of the following or may be learned with the practice of the invention.

To achieve the foregoing and other objectives, and in accordance with one aspect of the present invention, the improved Micro-Opto-Electro-Mechanical Systems (MOEMS) are provided to support the seamless and scalable integration of MEMS actuators and PLCs. Such MOEMS can integrate high-bandwidth waveguide networks of PLCs and miniaturized microstructures/actuators of MEMS into a single module.

Some of the essential components for optical communication system are devices that have branching, switching, filtering, and wavelength multiplexing functions. Until recently majority of these are fabricated using optical fibers or bulk optics to exhibit inherent limitations on size, speed, and large-scale integration capability. To overcome these limitations, many research groups around the world have pursued an investigation on planar lightwave circuits (PLCs) and silicon optical bench (SOB). The PLC and SOB came from the planar geometry of the waveguide circuits and the use of micromachined silicon chips to attach other optoelectronic components. The PLCs have already reached a level of development to produce a commercial component that can compete or surpass the fiber-optic or bulk-optic components. The silica-glass PLC is made from glass composition similar to that of optical fibers. And it has shown many benefits such as low transmission losses, efficient interface to optical fibers, and a capability to integrate various devices (i.e. directional couplers, filters, splitters, combiners, star couplers, multiplexers, demultiplexers, and switches) on a single substrate.

The MOEM-WS is an integrated hybrid microsystem: MOEMS, which is capable of providing all-optical switching within a PLC platform by adding MEMS microstructures/actuators. By integrating MEMS actuators and micromachined PLCs into a single structure, the normally passive PLC can actively switch optical signals and reconfigure the PLC network connectivity. The MOEM-WS can utilize electrostatically driven side actuators (i.e. comb drivers) to allow many unique benefits such as scalability, low cost, small crosstalk, compactness, and wavelength/polarization insensitivity. In the current technology, the conventional fiber optic switches require assembly and alignment of numerous optical components. The current optoelectronic packaging process for the fiber switches inevitably incurs high costs, long production time, and non-uniform device performance. A large-scale array expansion of fiber switch is also difficult due to size and discrete nature device configuration. Since the MOEM-WS utilizes the lithographically-defined PLCs and MEMS microstructures/actuators, it is ideally suited for a large-scale fiber switching applications involving an array of many input/output fiber ports. The present invention's unique device structure eliminates the individual alignment of MOEM-WS regardless of the number and location of MOEM-WS on the MOEMS platform, since every aspect of device geometry is defined and manufactured using lithography. This feature is particularly useful to produce scalable and reconfigurable OXCs and OADMs at low cost and high volume.

In the emerging DWDM metropolitan and local area networks, the major concern is not the network capacity but the network connectivity. Through its switching capability, the OADM can either add or drop communicating nodes inside the telecommunication networks as the network connectivity configuration changes. The number of active nodes in local area network can be dynamically increased or decreased depending on network traffic volume, fairness & priority of individual communicating nodes and so on. Besides the OADM, the OXC is another indispensable component for optical communication systems. It can switch and transmit optical signals directly between any input and output ports in both analog & digital formats and in a mixture of multiple data rates without electrical-to-optical or optical-to-electrical signal conversions. Due to the property that photons do not directly interact with each other in contrast with electrons, the OXC can be implemented on a single interconnect layer of PLC. It is possible to construct a strict-sense nonblocking OXC on a MOEMS platform by arranging multiples of MOEM-WS into the Spanke network architecture.

Still other objective of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawing:

FIG. 9 (comprising FIG. 9A–9C) is a view of hierarchical matrix architecture of fiber transpose blocks for a large-scale MOEM-XC switch. It illustrates that a large-scale 64×64 static cross-connect network can be constructed by hierarchically interconnecting 16 units of each input fiber-to-fiber connector block, fiber-hold block, and output fiber-to-fiber connector block used for 16×16 static cross-connect.

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
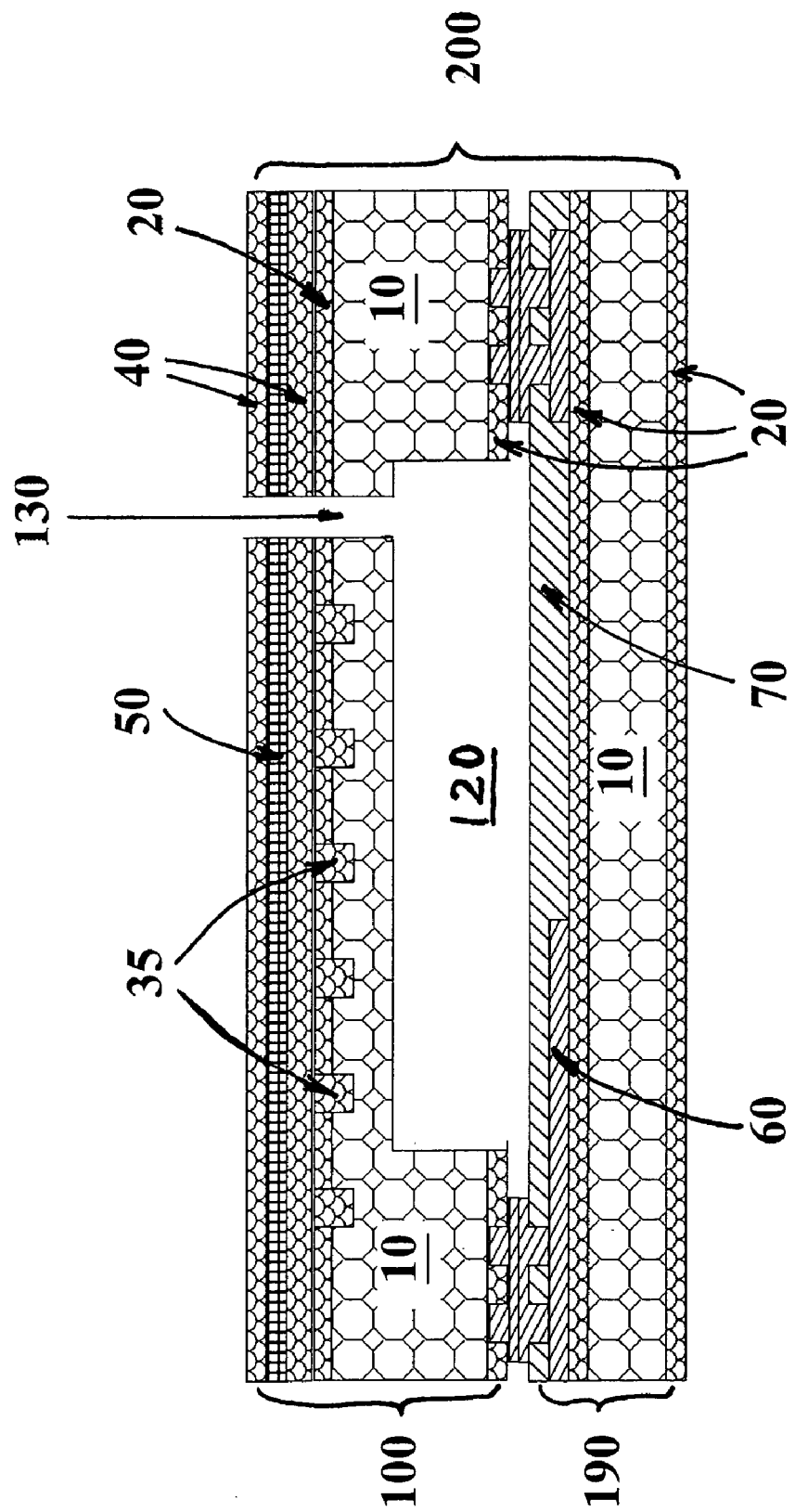
FIG. 1 is a side elevation view of a Micro-Opto-Electro-Mechanical Waveguide Switch (MOEM-WS) assembly for optical fiber switching, constructed according to the principles of the present invention.

Referring now to the drawing, the FIG. 1 shows a side elevation view of a Micro-Opto-Electro-Mechanical Waveguide Switch (MOEM-WS) assembly for optical fiber switching, constructed according to the principles of the present invention. In MOEM-WS, the MEMS actuator 180 provides a switching functionality whereas the micromachined PLC delivers a high-bandwidth interconnect network for optical signal transmission and distribution. By combining MEMS actuators and micromachined PLC networks on the same substrate, the normally passive PLCs can dynamically modify the optical network connectivity into any intended configurations within a short reconfiguration time. In FIG. 1, the micromachined PLC substrate 100 and support substrate 190 with electrical interconnect layers 60 are separately fabricated and bonded together. The electrostatically driven side actuator 180 (i.e. MEMS actuator or comb driver) constructed on the micromachined PLC substrate 100 is suspended on top of the support substrate 190 and it provides a horizontal movement of the sender waveguide port 80 relative to receiver waveguide ports 90. The separate fabrication of micromachined PLC substrate 100 and support substrate 190 can avoid both fabrication compatibility problem and device configuration conflicts of mixed-technology Microsystems. The integration of micromachined PLC substrate 100 and support substrate 190 creates a fiber switch 200 in the MOEM-WS device structure.

The MOEM-WS is one class of Micro-Opto-Electro-Mechanical System (MOEMS). The MOEMS is an integrated and mixed-technology microsystem utilizing both optoelectronic interconnect and MEMS fabrication/packaging technologies. The letter in the term "MOEMS" stands for "Micro" (micro-scale), "Optical" (integrated optical waveguide networks and passive/active micro-optical components), "Electronic" (integrated circuits and multilayer metal interconnects), "Mechanical" (micromachined silicon sensors/actuators and passive alignment structures), and "Systems". It also represents these components being integrated into a single microstructure by using IC compatible microfabrication and assembly technologies. Using the proposed MOEM device structures, the MOEM-WS can be fabricated in the lithographic batch processes without presenting any fabrication compatibility problems. The MOEM-WS, an integrated hybrid microsytem, provides the known benefits of MEMS technology (such as miniaturization, multiplicity, and microelectronics), in addition to a seamless integration of photonic & electronic devices and components into a single package.

In the MEMS technology, miniaturization allows structures of a few tens of micrometers to be fabricated with an accuracy in the sub-micrometer range, while multiplicity allows many structures to be simultaneously fabricated by pre-assembly and batch processes. Micro-optoelectronics provides a way to fabricate and integrate optoelectronic & electronic devices and components using the conventional IC-compatible micromachining technology. And the resulting integration provides a smart microsystem having a variety of technologies (photonic, electronic and micromechanic). The current invention fabricates integrated optic waveguide switches in a batch mode using a well-established IC fabrication process, thereby improving performance and reliability, and reducing costs.

In general the MEMS sensors and actuators can lead to a completely different class of mechanical, fluid, thermal, optical, biological, and chemical devices and components at the micro scale, which would exhibit previously impossible improvements in reliability, performance, and cost. Multidisciplinary efforts on design, fabrication, and packaging of MEMS sensors and actuators are currently underway to provide desired internal structures and functionality within the integrated microsystem. Some of the prominent subsystems for MEMS may include: physical (position, velocity, acceleration, and pressure), biological and chemical sensors; motors; valves and pumps; optical mirrors, modulators, scanners, and switches; mechanical actuators, levers, flexures, bearings, hinges, springs, and couplings; seals, interfaces, and packages and others. Currently there exist a variety of MEMS actuation methods such as electrostatic, magnetic, thermal, shape memory alloy (SMA), impact, and piezoelectric mechanisms and so on by utilizing a wide array of physical effects. Depending on the application, a suitable MEMS actuation mechanism can be selected and employed by considering the amount of power available, suitable ranges of electrical voltages and currents, temperature requirements, size constraints, process integration, device packaging, and so on.

In MEMS, bulk micromachining means that three-dimensional structures are etched into the bulk of crystalline or non-crystalline materials whereas surface micromachining represents the teatures built up layer-by-layer on the substrate surface. In bulk micromachining, bulk materials such as silicon, quartz, GaAs, InP, Ge, SiC, and glass are sculpted by orientation-dependant (anisotropic) and/or orientation-independent (isotropic) etch processes. In a typical surface micromachining, a dry etching defines the surface structures in x-y plane and a subsequent wet etching releases them from the plane by undercutting a sacrificial layer. In surface micromachining, a high vertical structure can be constructed by building large and flat structures horizontally and then rotate them on a hinge to an upright position as reported in polysilicon (poly-Si) hinges by Pister et al. A flat and long structural poly-Si features can be rotated out of the substrate plane and erected to create highly vertical microstructures such as hot wire anemometers, micro windmill, and micro-optical bench with mirrors, gratings, and micro-lenses. The hinged vertical mirror actuator can serve as a MEMS mirror actuator. The hinged vertical mirror actuator is beneficial when a large mirror surface is required. However the friction around the hinges and the need to erect and assemble hinged vertical mirrors makes the practical implementation of hinged vertical mirror actuator somewhat difficult.

Essential components for optical communication systems are the devices that have branching, switching, filtering, and wavelength multiplexing functions. Until recently majority of these are fabricated using optical fibers or bulk optics, which showed inherent limitations on size, mass production, and large-scale integration capability to implement a multi-functional subsystem. To overcome these limitations, many groups around the world have pursued a planar waveguide research, such as planar lightwave circuits (PLCs) and silicon optical bench (SOB). These names came from the planar geometry of the waveguide circuits and the use of micromachined silicon chip to attach other optoelectronic components. Recently the PLCs have reached a level of development to produce commercial components that can compete and surpass fiber-optic or bulk-optic components. Silica glass integrated waveguide circuits, made from glass composition similar to that of optical fibers, have shown low transmission losses, direct and low-loss interfacing to optical fibers, and capability to integrate various devices such as directional couplers, filters, splitters, combiners, star couplers, multiplexers, demultiplexers, and switches, into a single substrate. The PLCs can also be micromachined to create a more flexible platform such that PLC and SOB can be seamlessly integrated.

In general the optical waveguides can successfully be formed by using both crystalline and non-crystalline materials. Optical waveguides formed using non-crystalline materials generally provide low propagation loss and economical fabrication, although crystalline materials, including semiconductors, are necessary for performing active functions such as optical signal generation, detection, and modulation. Crystalline optical waveguides are a part of semiconductor lasers and are used in semiconductor photonic integrated circuits. Another type of crystalline optical waveguide is made in lithium niobate by titanium diffusion, where they can build modulators, switching arrays, and polarization controllers. Among non-crystalline materials, the silica glass is a choice of optical waveguide material for PLC by the leading communication research groups. The silica glass waveguide has a stable and well-controlled refractive index with a very small propagation loss. It is highly transparent over a broad spectrum of optical wavelengths. Currently there exist several major ways of forming thick silica glass films for optical waveguides and these are flame hydrolysis deposition (FHD), plasma-enhanced chemical vapor deposition (PE-CVD), low-pressure chemical vapor deposition (LP-CVD), and electron beam deposition. All of these fabrication methods are using a reactive ion etching (RIE) to pattern a waveguide core and the patterned waveguide cores are generally buried within the layers of silica glass buffers. On the other hand, the polymer is another promising material for a low-cost PLC, though it suffers from problems related to long term stability, high power handling capability, waveguide shrinkage, and so on.

It should be noted that the PLC chip for the MOEMS application is not limited in utilizing a variety of optical waveguide materials including polymers so that it can take advantages of advancement and applicability of various waveguide material and processing technologies. Furthermore both single-mode and multi-mode electromagnetic wave propagation along the waveguide is supported on the PLC platform.

Figure 2:
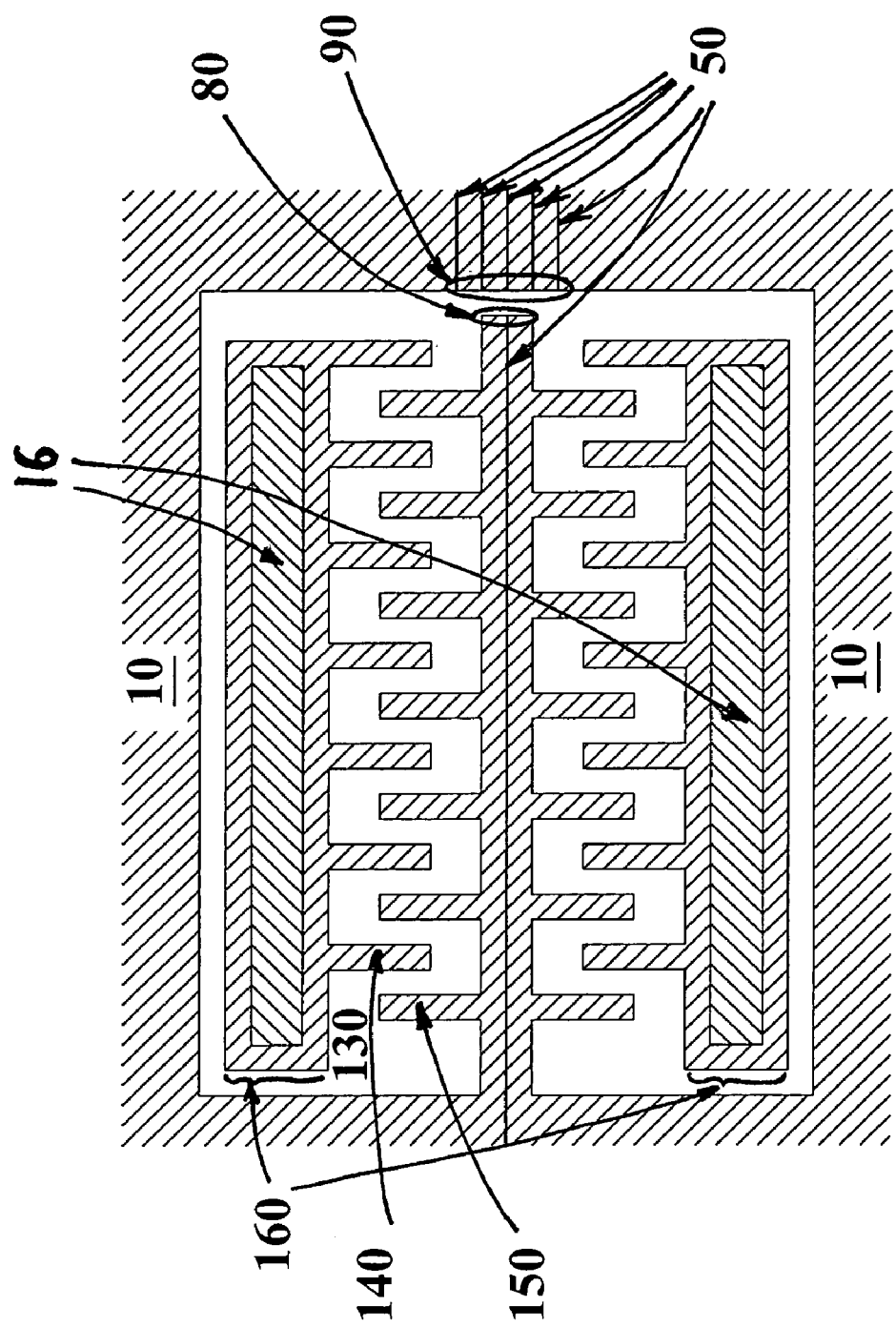
FIG. 2 a diagrammatic view of MOEM-WS, showing the details of micromachined PLC network and MEMS comb driver actuator to construct a moving waveguide switch on MOEMS.

The FIG. 2 shows a diagrammatic view of MOEM-WS, showing the details of micromachined PLC cores 50 and MEMS actuator 180. The PLC core 50 for sender waveguide port 80 of MOEM-WS is integrated on the moving cantilever flexure 170 of MEMS actuator 180. This PLC core 50 can move around and adjust its position relative to the fixed receiver waveguide ports' 90 cores 50. The MEMS actuator 180 shown in FIG. 2 utilizes an electrostatically driven side actuator (i.e. comb driver), which is composed of moving cantilever flexure 170 with moving comb fingers 150 and stationary combs 160 with stationary comb fingers 140. The electrostatic force between moving and stationary comb fingers 150, 140 provides a side swing motion to the moving cantilever flexure 170. The stationary comb anchor 16 provides a permanent bonding to the support substrate 190 and the stationary comb 160 is electrically insulated from the surrounding silicon structures by the micromachined flee space 130 on the MOEM-WS. The stationary comb 160 can take the electrical control signals for MOEM-WS operations by using the metal interconnect layers 60 underneath or by the wire-bonded interconnects above the silicon structural layer.

The FIG. 3 (comprising FIG. 3A–3N) is a side elevation view of MOEM-WS at various stages of fabrication. The FIG. 3A through FIG. 3H shows the fabrication steps for micromachined PLC substrate 100, whereas the FIG. 3I through FIG. 3L illustrates those for support substrate 190. The FIG. 3M and FIG. 3N explains the processes for wafer bonding and structure layer release. The PLC networks are constructed by layers of micromachined silica glasses, where the waveguide core 50 is buried between upper and under silica glass cladding layers 40.

Figure 3A:
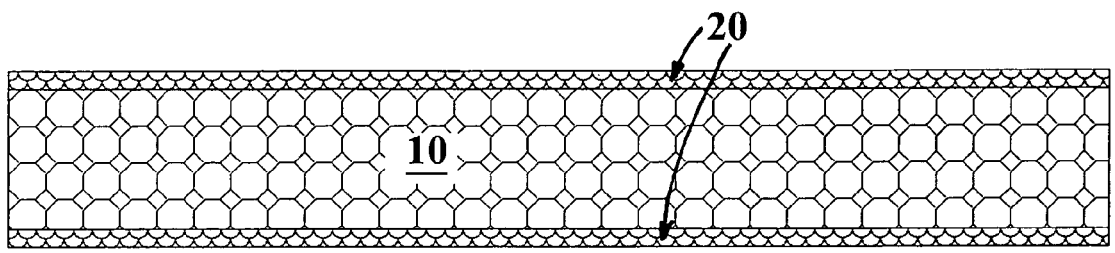
FIG. 3 (comprising FIG. 3A–3N) is a side elevation view of MOEM-WS shown in FIGS. 1 and 2, showing the micromachined PLC and support substrates at various stages of fabrication, wherein the PLC network is constructed of silica glass or polymer and the waveguide core is buried within the waveguide buffer layers.

In FIG. 3A, a silicon wafer 10 is thermally oxidized to form a thin silicon dioxide layer 20 on both sides of wafer.

Figure 3B:
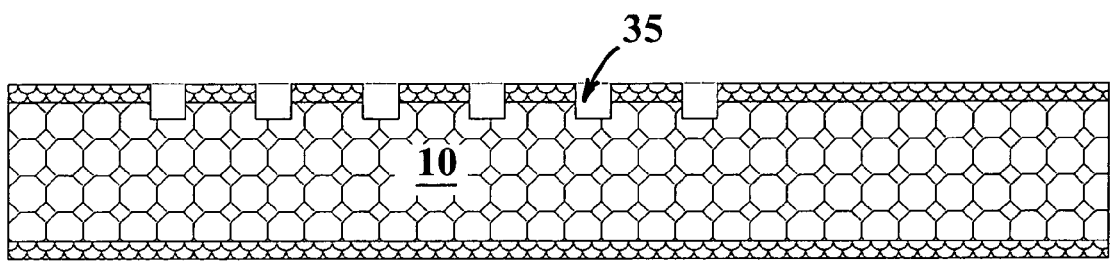

In FIG. 3B, the microgrooves 35 are formed by selectively removing silicon out of the substrate. The microgrooves 35 on silicon can be fabricated by a variety of standard silicon micromachining methods utilizing either wet or dry etching processes.

Figure 3C:
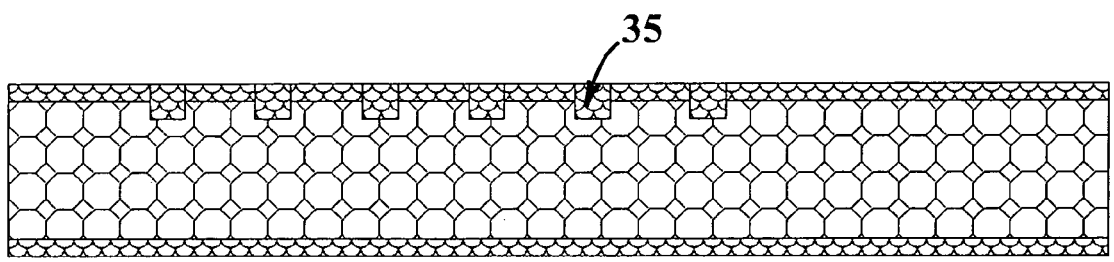

In FIG. 3C, a deposition of silica glass layer 40 on the micromachined silicon substrate of FIG. 3B fills the microgrooves 35 and the deposited silica glass layer 40 is planarized through a polishing process such as chemical-mechanical-polishing (CMP). Prior to planarization process, the deposited silica glass layer 40 can be optionally annealed at high temperature for consolidation. The deposited and planarized silica glass layer 40 provides a good adhesion of subsequent cladding and core silica glass layers 40, 50 to the silicon structure layer 10. The silicon microgrooves filled with silica glass material 35 promotes a strong adhesion between silica glass layer 40 and silicon wafer 10 such that those layers with different material compositions will not be separated even if the moving cantilever flexure 170 is swung away to its farthest positions.

Figure 3D:
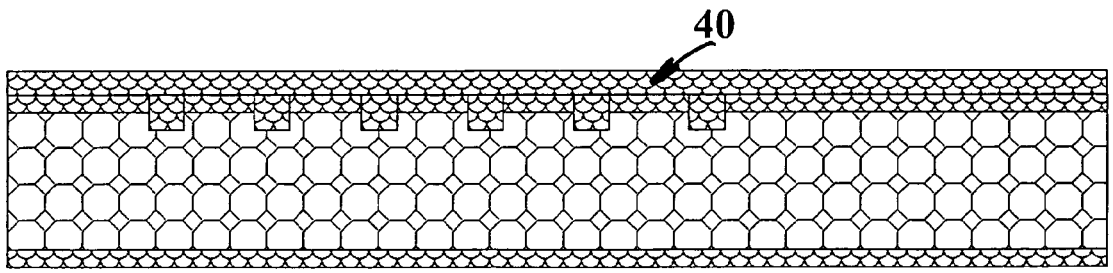

In FIG. 3D, an under cladding silica glass layer 40 is deposited on top of the planarized silica glass layer 40 of the same material composition to provide a sufficiently thick under-cladding for waveguide formation.

Figure 3E:
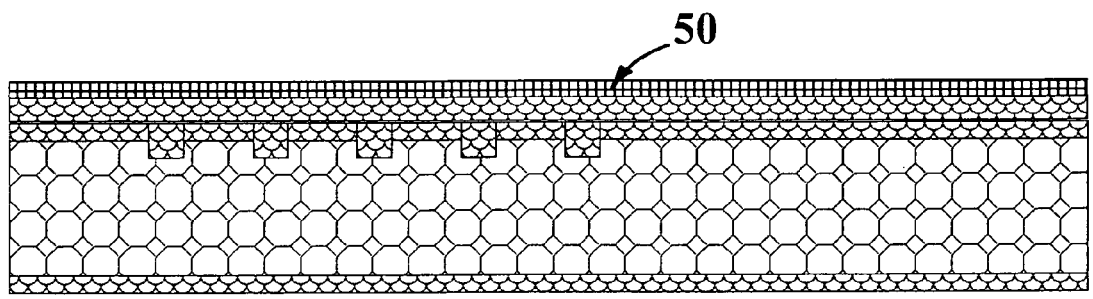

In FIG. 3E, a silica glass core layer 50 with a slightly higher refractive index than the cladding layer material is deposited on top of the under cladding layer 40. Then the deposited silica glass layers 40, 50 are annealed at high temperature for consolidation. Finally photolithography and reactive ion etching (RIE) processes pattern the waveguide core layer 50.

Figure 3F:
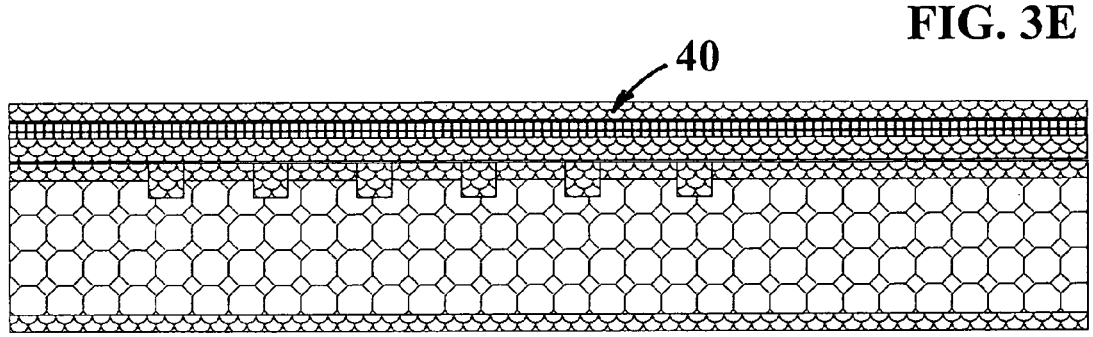

In FIG. 3F, an upper cladding silica glass layer 40 is deposited on top of the patterned waveguide core 50 and then the final structure is consolidated again by annealing at high temperature.

Figure 3G:
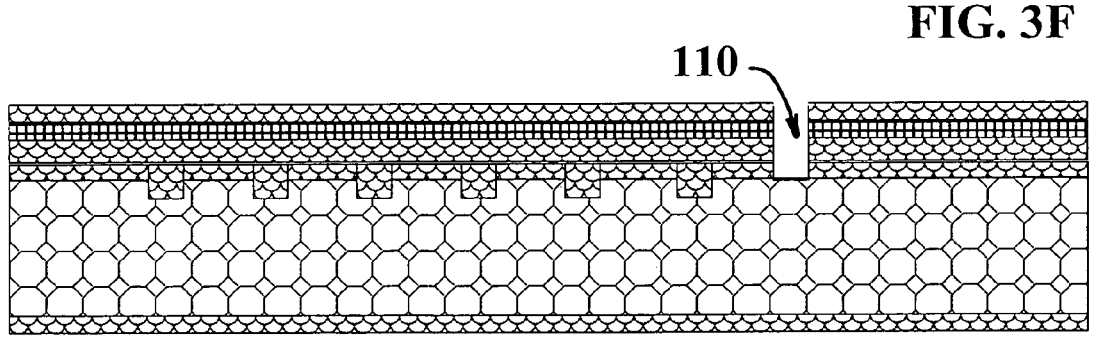

In FIG. 3G, a portion of material for the silica glass waveguide layers is etched away by RIE processes to form a free space gap 110 for MEMS microstructures. The free space gap 110 in the silica glass layers will be transformed into the micromachined free space 130 through a structure layer release process to be described in FIG. 3N.

Figure 3H:
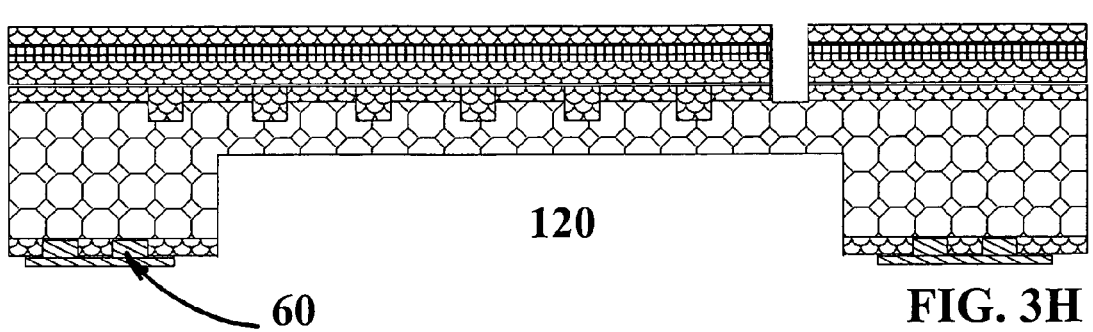

In FIG. 3H, a metal layer 60 is deposited and patterned on the backside of PLC substrate. And the PLC substrate's backside is micromachined to form a half-open micro cavity 120 using dry or wet etching processes.

Sometimes it is necessary to provide multiple electrical signal interconnect layers on the MOEMS platform to support the distribution and routing of MEMS actuator control signals. For a small-scale MOEMS platform, the MEMS actuator control signals can be supplied through a multiple of wire bonds without having any dedicated signal interconnect layers. However, for a large-scale MOEMS platform, it is often necessary to integrate signal and power routing layers into the MOEMS structure. The silicon support substrate 190 can provide the electrical signal interconnect layers. Furthermore the silicon support substrate 190 cab also work as a support substrate to anchor the MEMS microstructures on micromachined PLC substrate 100.

Figure 3I:
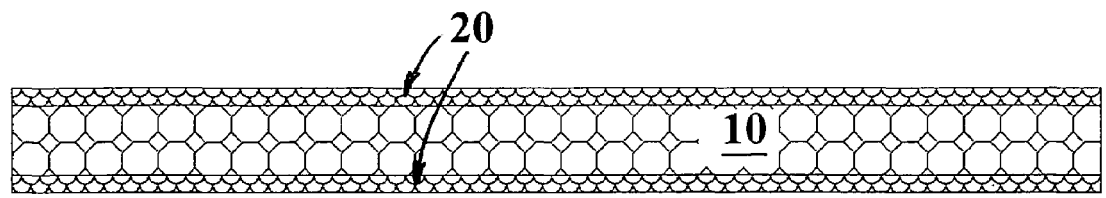

In FIG. 3I, a silicon wafer 10 for the silicon support substrate 190 is thermally oxidized to form a thin silicon dioxide layer 20 on both sides of wafer.

Figure 3J:
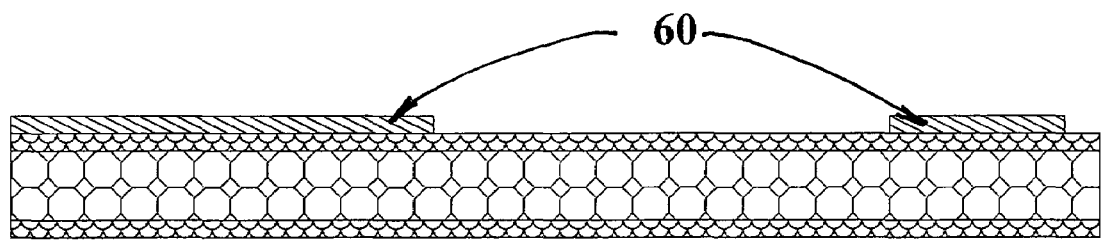

In FIG. 3J, a metal layer 60 is deposited on top of the silicon dioxide layer 20 of silicon wafer 10. The deposited metal layer 60 is photolithography patterned and etched to construct a metal interconnect line.

Figure 3K:
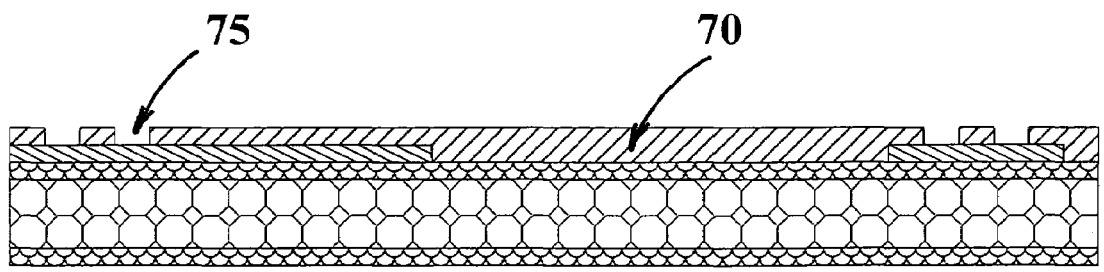

In FIG. 3K, a dielectric insulating layer 70 is deposited on the metal layer and subsequently patterned to form via holes 75.

Figure 3L:
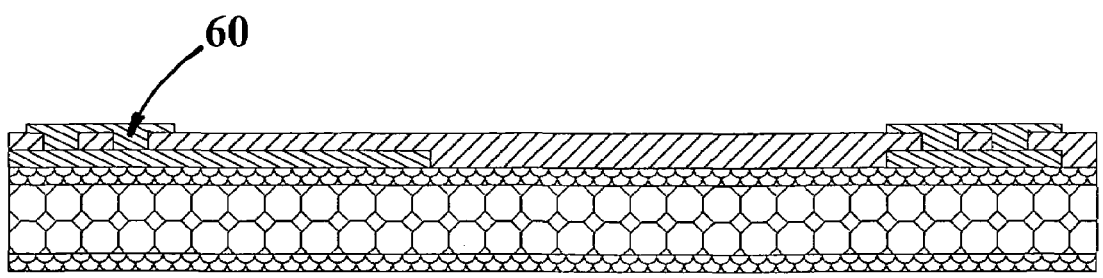

In FIG. 3L, a metal layer 60 is again deposited on the dielectric insulating layer and this layer is patterned to form bonding pads.

Figure 3M:
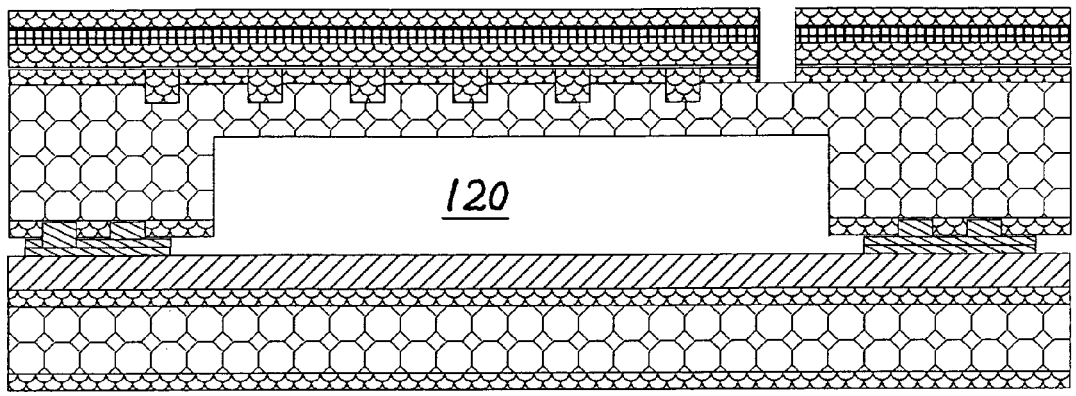

In FIG. 3M, the PLC substrate 100 of FIG. 3H is bonded to the support substrate 190 of FIG. 3L and the micro cavity 120 is enclosed. The substrate bonding can be accomplished by a variety of wafer-bonding techniques such as silicon fusion, thermo-compression, adhesives, flip-chip, eutectic and anodic bondings.

Figure 3N:
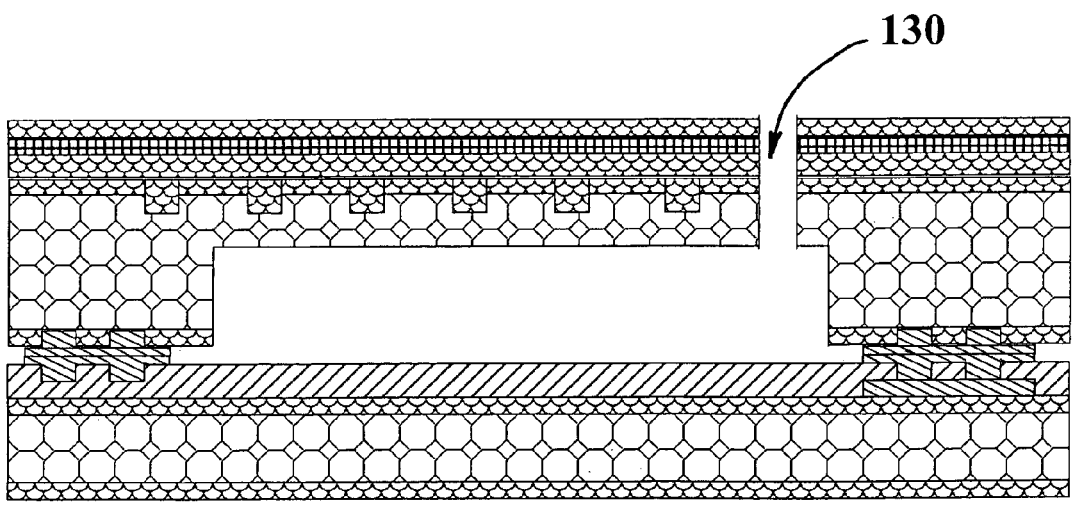

In FIG. 3N, the bonded structure of FIG. 3M is further micromachined through dry etching processes in order to construct a MEMS actuator 180 with a moving cantilever flexure 170 being released from the surrounding silicon microstructures. This figure as well as FIG. 4C shows that the sender and receiver waveguide ports 80, 90 are separated with each other by removing a portion of silicon structural layer without silica glass mask 15. The removal process for a portion of silicon structural layer without silica glass mask 15 results in a micromachined free space 130 on the MOEM-WS. The MOEM-WS substrate of FIG. 3N can be diced into individual MOEM-WS chips. Subsequently these chips will be bonded with fibers and electrical wires to interface with both electrical and optical signals.

Aside from the fabrication procedures described in the FIG. 3, the MOEM-WS can also be fabricated by using a silicon-on-insulator (SOI) structure, since the optical waveguide layers can be deposited on the SOI wafers and subsequently micromachined. The thin silicon layer on SOI wafer can be sculptured into the MEMS structures and the sculptured MEMS structures with optical waveguide layers can be released to form a moving cantilever flexure 170 by removing the insulator layer (i.e. sacrificial layer) on the SOI wafer. The MOEM-WS utilizing the SOI wafer is a single-wafer microsystem eliminating a need for the silicon support substrate 190 and the wafer bonding procedure. Hence the MOEM-WS can be constructed in single-wafer SOI or wafer-bonded silicon microstructures by utilizing either device configurations described above.

Figure 4A:
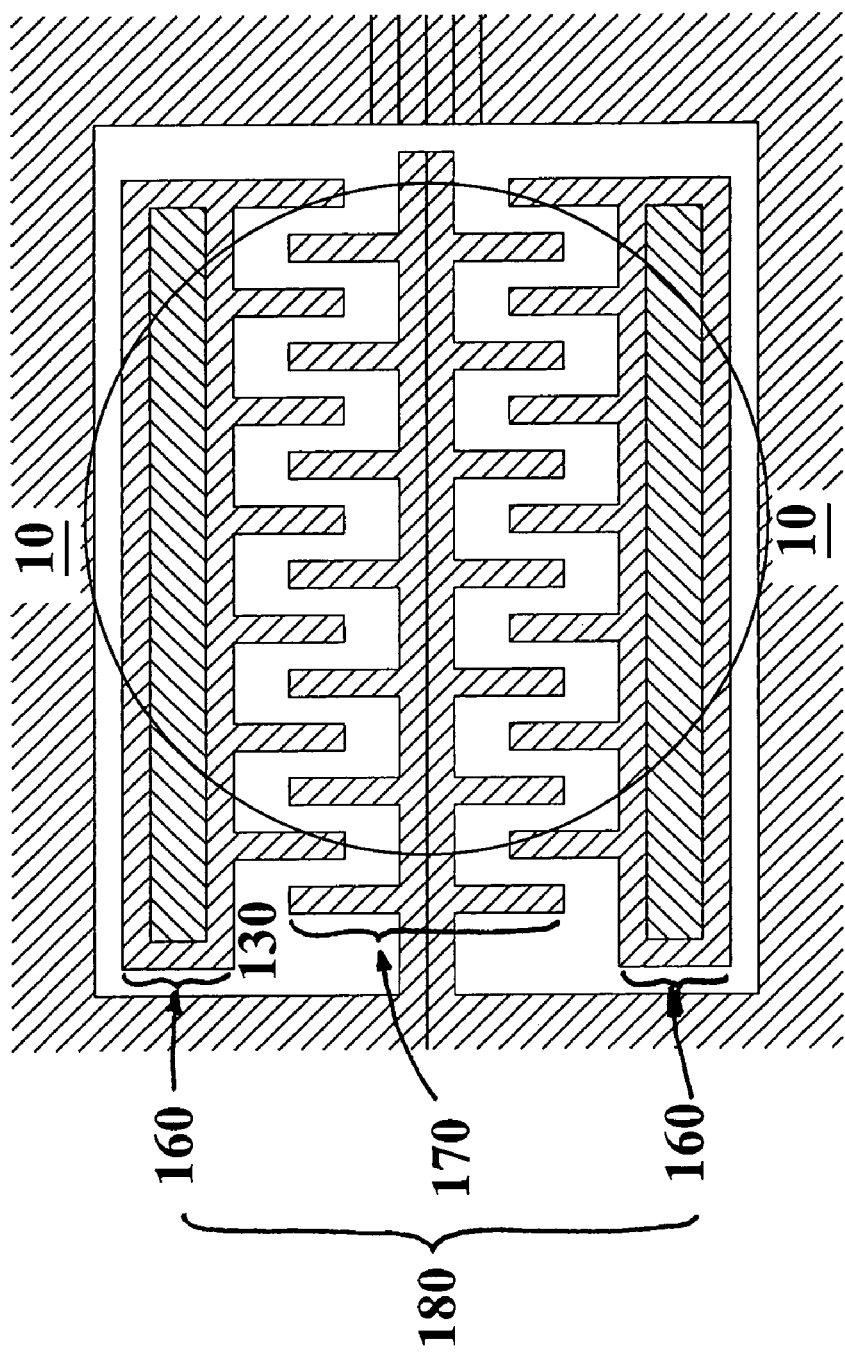
FIG. 4 (comprising FIG. 4A–4C) is a detailed diagrammatic and side elevation views of MOEM-WS of FIG. 3, showing the self-aligned & micromachined comb fingers and silicon microgrooves on PLCs.
Figure 4B:
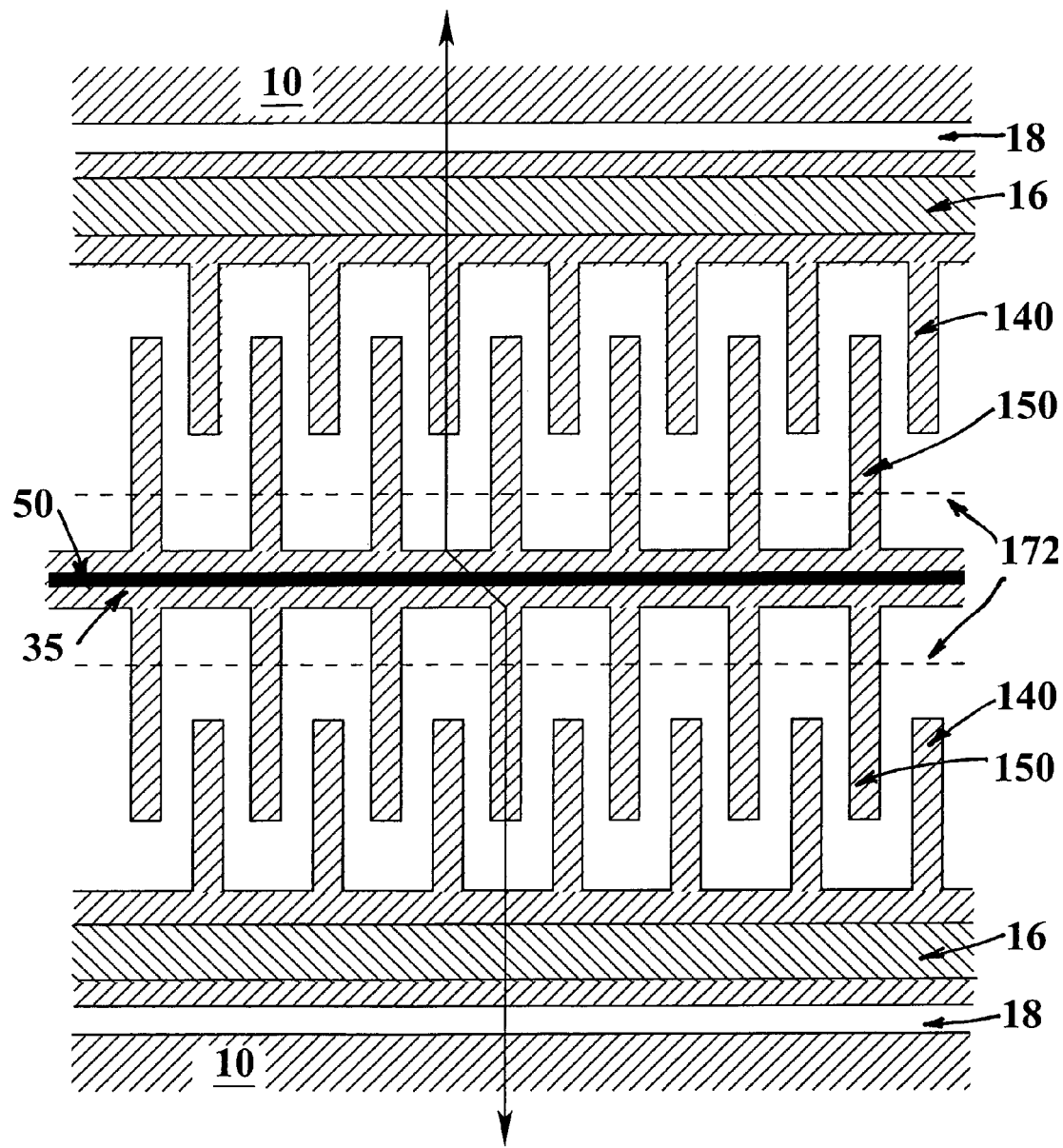
Figure 4C:
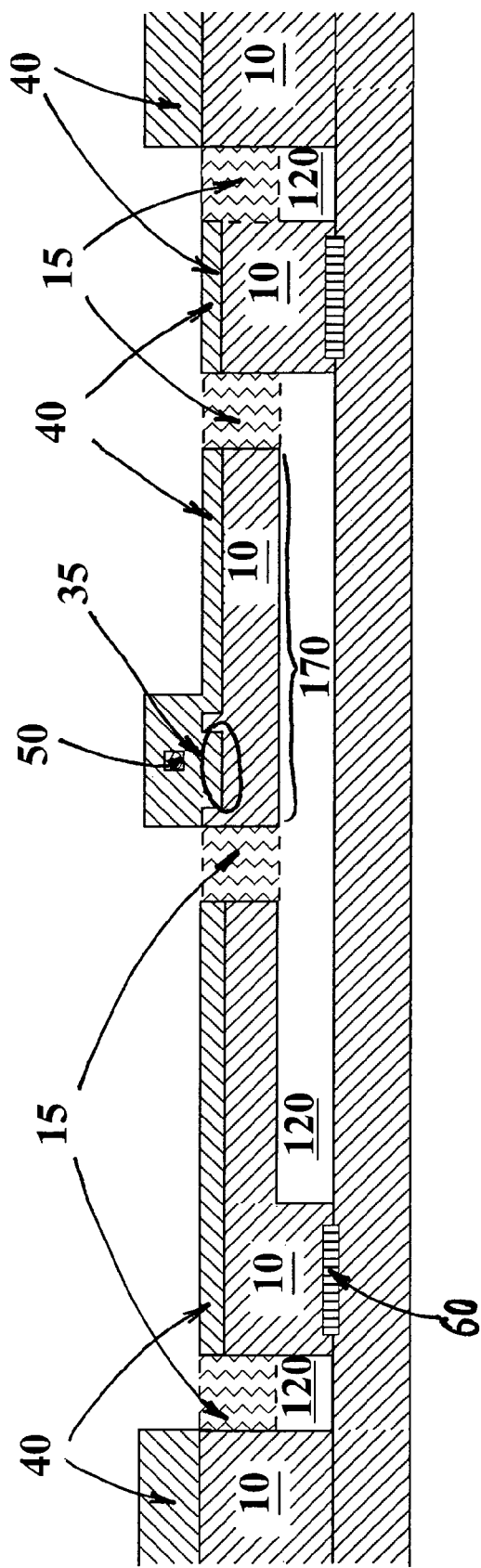

The FIG. 4 (comprising FIG. 4A–4C) is a detailed diagrammatic and side elevation views of MOEM-WS of FIG. 3, showing a self-aligned & micromachined comb fingers 140, 150 and silicon microgrooves 35 on PLCs. The comb driver 180, also known as electrostatically driven side actuator, is a simple and ingenious actuator, where one comb 170 is free to move while the other 160 is stationary as shown in FIG. 4A. The comb driver 180 can be implemented into a variety of configurations such as unidirectional, bi-directional, linear, or rotary comb actuators. Both the moving and stationary combs 170, 160 are indirectly anchored to the support substrate 190 through the stationary comb anchors 16. When electrical control signals are applied to the stationary combs 160, the moving comb 170 moves either toward or away from the stationary comb 160 due to the electrostatic potential accumulated between the combs 170, 160. In FIG. 4 the moving comb 170 by itself is a movable cantilever flexure 170 with the comb fingers 150 on the sides, where its micro mechanical characteristics are determined by geometrical configuration of combs 140, 150, cantilever flexure spring constant, and electrical control signals. Therefore note that the moving comb 170 is an identical object for the moving cantilever flexure 170. In the case of comb drive 180 as shown in FIG. 4A, the electrostatic force caused by voltage across the moving and stationary combs 170, 160 can control the position of moving cantilever flexure 170 wherein the sender waveguide port 80 is integrated. The comb driver 180 is a very well known MEMS component and the mathematical models for comb driver's spring constant, resonant frequency, and displacement are well studied and extensively published in the leading MEMS journals.

A cantilevered beam suspension can provide the spring motion for the moving comb 170. The mechanical properties of materials determine the deflection of cantilever beams and the first-order model for cantilever beam deflection will be described in the following. Every solid material exhibits some sort of stress after it is formed into a certain shape. The stress σ is a force per unit area and it can be either tensile or compressive stresses. Consider a linear bar under a stress by either pushing or pulling both ends of the bar. Let's assume that the force is uniformly distributed over the cross section of the bar. The stress on the bar induces an elongation of the bar and the ratio of elongation to the original length of bar is known as strain ∈. A linearly elastic bar follows the Hook's law by exhibiting that the strain ∈ is linearly proportional to the stress σ on the bar as shown in the formula below:

$$\sigma = E \in$$

The linear constant E relating stress σ and strain ∈ in the Hook's law is known as modulus of elasticity or Young's modulus and its value depends on the material characteristics of the linearly elastic bar. For the cantilever suspension beam used in the comb driver, it is important to determine the deflection v(L) and angle of rotation θ at the free-end of the beam. The force behind the deflection of movable cantilever flexure can be an electrostatic potential accumulated between the stationary and moving combs 160, 170. Based on the theory of electrostatics the electrostatic force can be calculated as follows:

$$F = \frac{n \cdot \varepsilon_0 \cdot H \cdot V^2}{g}$$

Here n, $\varepsilon_0$, H, V, and g are the number of combs, dielectric permitivity of the material among comb fingers, comb height, applied voltage, and the gap between combs respectively. Assuming that the force is uniformly distributed along the side of cantilever beam flexure, the deflection v(L) and angle of rotation θ at the free-end can be expressed as:

$$v(L) = \frac{F \cdot BL}{8 \cdot E \cdot I} = \frac{3 \cdot n \cdot \varepsilon_0 \cdot V^2 \cdot BL^3}{2 \cdot g \cdot E \cdot BW^3}$$

$$\theta = \frac{F \cdot BL^2}{6 \cdot E \cdot I} = \frac{2 \cdot n \cdot \varepsilon_0 \cdot V^2 \cdot BL^2}{g \cdot E \cdot BW^3}$$

Here F, BL, E, and I are the force, beam length, Young's modulus, and moment inertia of the moving cantilever flexure 170 respectively. By substituting F and I with the appropriate formulas, the final expressions are obtained in the above formulas. The moment of inertia of the moving cantilever flexure with a cross-section of rectangular shape is given by:

$$I = \frac{BH \cdot BW^3}{12}$$

In the final expressions for the deflection v(L) and angle of rotation θ at the free-end, the notations of BW, n, $\varepsilon_0$, H, V, and g represent the beam width of moving cantilever flexure 170, number of combs, dielectric permitivity of materials between combs, comb height, applied voltage and gap among comb fingers respectively. Note that BH (beam height of the moving cantilever flexure 170) is same as H (comb height) and these are cancelled with each other in the final expressions. The first-order model for cantilever beams provide some insights on the MOEM-WS design parameters and their inter-relationship. To understand the feasibility of MOEM-WS, the following design parameters can be considered for MOEM-WS prototyping: E=175 GPa for single crystal silicon, BL=12,000 μm, BW=50 μm, H=100 μm, FW (comb finger width)=20 μm, g (comb finger gap)=10 μm, V=30 V, and $\varepsilon_0$=8.854×10E-14 F/cm. If these design parameters are applied to the first-order model for cantilever beams, the deflection v(L) and angle of rotation θ at the free-end become 18.88 μm and 0.12 degrees. If we assume a receiver waveguide port 90 with core width 52 of 8 μm and waveguide channel separation 58 of 8 μm, the fiber switch 200 with 1-input/3-output configuration utilizing the MOEM-WS device structure requires a deflection about 16 μm for the moving cantilever flexure 170. The moving cantilever flexure 170 of this example can provide a sufficient amount of movement for the sender waveguide port 80 to implement the fiber switch 200 with 1-input/3-output configuration.

The FIG. 4B shows the detailed and enlarged view of the comb driver shown in FIG. 4A. The FIG. 4C illustrates the layered structures of MOEM-WS by showing the cut-away side elevation view of FIG. 4B. The isolation trenches 18 in FIG. 4B electrically insulate the stationary combs 160 from the surroundings. These isolation trenches 18 are fabricated by etching away the portion of silicon structure layer without silica glass mask 15 on FIG. 4C by going through the MOEM-WS structure layer release process illustrated in FIG. 3N. Both isolation trenches 18 and micromachined free space 130 on MOEM-WS are constructed by etching away the portion of silicon structure layer without silica glass mask 15 until the micro-cavity 120 underneath is reached.

Some of the novel features shown in both FIGS. 4B and 4C are the self-aligned & micromachined comb fingers 140, 150 and silicon microgrooves 35 on PLCs. The silicon microgrooves 35 enhance the adhesion of waveguide layers to the MOEM-WS structure layer by increasing the contact areas between these layers. The silicon microgrooves 35 works as hold-microstructures on the moving cantilever flexure 170. The combination of increased contact areas and hold-microstructures of silicon microgrooves 35 can reduce the risks of inter-layer peelings between silica glass and silicon structure layers when the moving cantilever flexure 170 moves around. The hold-microstructures can utilize a variety of microstructure for the optimal inter-layer adhesion and these can be positioned on the moving cantilever flexure 170 in any locations and in any numbers depending on the size of individual silicon microgroove 35. As the MOEM-WS wafer reduce its temperature after the thermal annealing processes, the silica-glass material filling the silicon microgrooves 35 will shrink its volume less than the surrounding silicon. This phenomenon is the result of combined effects from high-temperature thermal annealing processes and thermal expansion coefficient differential for silica glass and silicon materials. This differential contraction of silica-glass material and surrounding silicon can further avoid the peeling between silica glass and silicon structure layers.

The comb microstructures of MOEM-WS can be fabricated in a variety of ways, but one of the promising silicon etching method is a deep silicon reactive ion etch (RIE) by the Bosch process utilizing inductively coupled plasma (ICP) reactors. The ICP reactor provides low pressure (1 to 100 mTorr), high degree of ionization (2 to 10%), high aspect ratio etching, and high rate of material removal by ion impact. The ICP silicon etching process can fabricate a variety of silicon microstructures with trench aspect ratio upto 50:1, beam aspect ratio upto 90:1, and etch depth covering from less than 2 micrometers to larger than 500 micrometers. Currently this process provides the silicon etch rate upto 12 micrometer/minute, Si:Resist mask selectivity upto 250:1, Si:Oxide mask selectivity upto 1000:1, etch uniformity less than +/−5% and controllable profile angle of 90 +/−1 degrees with a room-temperature process environment. As suggested in the formulas for deflection v(L) and angle of rotation θ at the free end off the beam, it is highly beneficial to fabricate comb microstructures with long finger length fine finger pitch, and small finger gap. Currently the silica-glass micromachining technique exhibits many limitations on minimum feature size, etch rate, and etch depth of the microstructures compared to the silicon micromachining techniques. Since the microstructures on MOEM-WS require both silica glass and silicon materials to be micromachined, it is beneficial to utilize the self-aligned & micromachined comb microstructure to the discussed below. As shown in FIG. 3C, the microstructures for silicon microgrooves 35 and comb fingers 140, 150 are etched away by the deep silicon RIE using ICP. A fine silicon microstructure with a small feature size can be fabricated in this fabrication step since the microstructure's etch depth is fairly small. Through the subsequent silica glass deposition, annealing, and polishing processes, the silicon microstructures can be filled with silica glass material. Then the silica glass waveguide layers can be constructed by following the processes described in FIG. 3D, FIG. 3E, and FIG. 3F. The silica glass waveguide can be micromachined in the fabrication step for FIG. 3G. In FIG. 3G the silica glass layers are etched away until the portion of silicon structure layer without silica glass mask 15 is surfaced. The mask for silica glass micromachining process of FIG. 3G can utilize simple rectangles without any fine comb finger structures, since it defines only coarse structures (i.e. moving cantilever flexure 170 and isolation gaps 18 for stationary combs 160). Note that the moving cantilever flexure's boundary lines 172 do not include any comb fingers structures. As the silica glass layer is etched away to surface the portion of silicon structure layer without silica glass mask 15, the silica-glass material filling both silicon microgrooves 35 and comb fingers 140, 150 are not completely etched away due to the additional thickness accomplished by the microstructures filled with silica glass material. This residual layer of silica-glass material can serve as a self-alignment mask during the silicon structure release process to be performed in FIG. 3N. Again the waveguide core 50 is buried between upper and under cladding materials 40 and the waveguide network is deposited on top of the moving silicon cantilever flexure 170.

In the guidedwave optical switch technology, three classes of switching mechanisms can be identified for the moving optical fiber switches and these are 1) fiber-to-fiber switching, 2) fiber-to-waveguide switching, and 3) waveguide-to-waveguide switching. In first the fiber-to-fiber optical switching is a simple and direct optical switching mechanism with low insertion losses. But the actuation for this type of optical switch mechanism requires a large amount of actuator displacement. In addition this mechanism demands the discrete optical components to be aligned and packaged individually to result in a high cost. Secondly the fiber-to-waveguide optical switching is a hybrid method by employing optical fibers and integrated optic waveguides at both ends of the receiver/sender ports. The inherent advantage of this mechanism is a reduction on amount of actuator's movement for switching, since the integrated optical waveguides at the receiver/sender ports are spaced closer than the optical fibers for fiber-to-fiber switching. It is not necessary to align and package multiple optical fibers at the receiver/sender ports. But this mechanism requires fiber-to-waveguide couplers to interface optical signals. In third the waveguide-to-waveguide optical switching is a fully integrated switching mechanism. It allows a cascaded switch array on a single substrate to realize a large-scale integration of switches. The optical switching time is small, as it requires relatively a small amount of actuator movement, and the integrated nature of this mechanism makes the alignment & packaging of discrete optical components unnecessary. But it requires fiber-to-waveguide couplers or waveguide-to-fiber couplers to interface signals from or to optical fibers and it could exhibit relatively large amounts of optical switch insertion losses. The MOEM-WS is essentially a moving waveguide switch utilizing the waveguide-to-waveguide optical switching mechanism by the aid of MEMS actuator 180. The MOEM-WS employing the waveguide-to-waveguide switching scheme requires a small amount of waveguide movement, since the PLC cores 50 are spaced closer than the fiber cores used in the moving fiber-to-fiber switches. Optical fiber diameters for the telecommunication systems are typically 125 micrometers for both single and multimode fibers, which results in a minimum fiber separation of 125 micrometers for the fiber-to-fiber switching. The typical PLC channel separations 58 on the waveguide-to-waveguide switching ranges from 5 μm to 20 μm and it allows the optical channel density for the MOEM-WS one order higher than that of moving fiber-to-fiber switches. Furthermore the photolithographic fabrication processes prearrange the relative positions of sender port 80 and receiver port 90 of MOEM-WS to eliminate the alignment and packaging processes of discrete optical components used in the moving fiber-to-fiber switches. The fully integrated nature of MOEMS-WS using the lithographic PLC fabrication processes results in a small amount of height differentials and gap width 56 between the sender and receiver ports 80, 90 to assure at consistent and reliable MOEM-WS operation.

Figure 5:
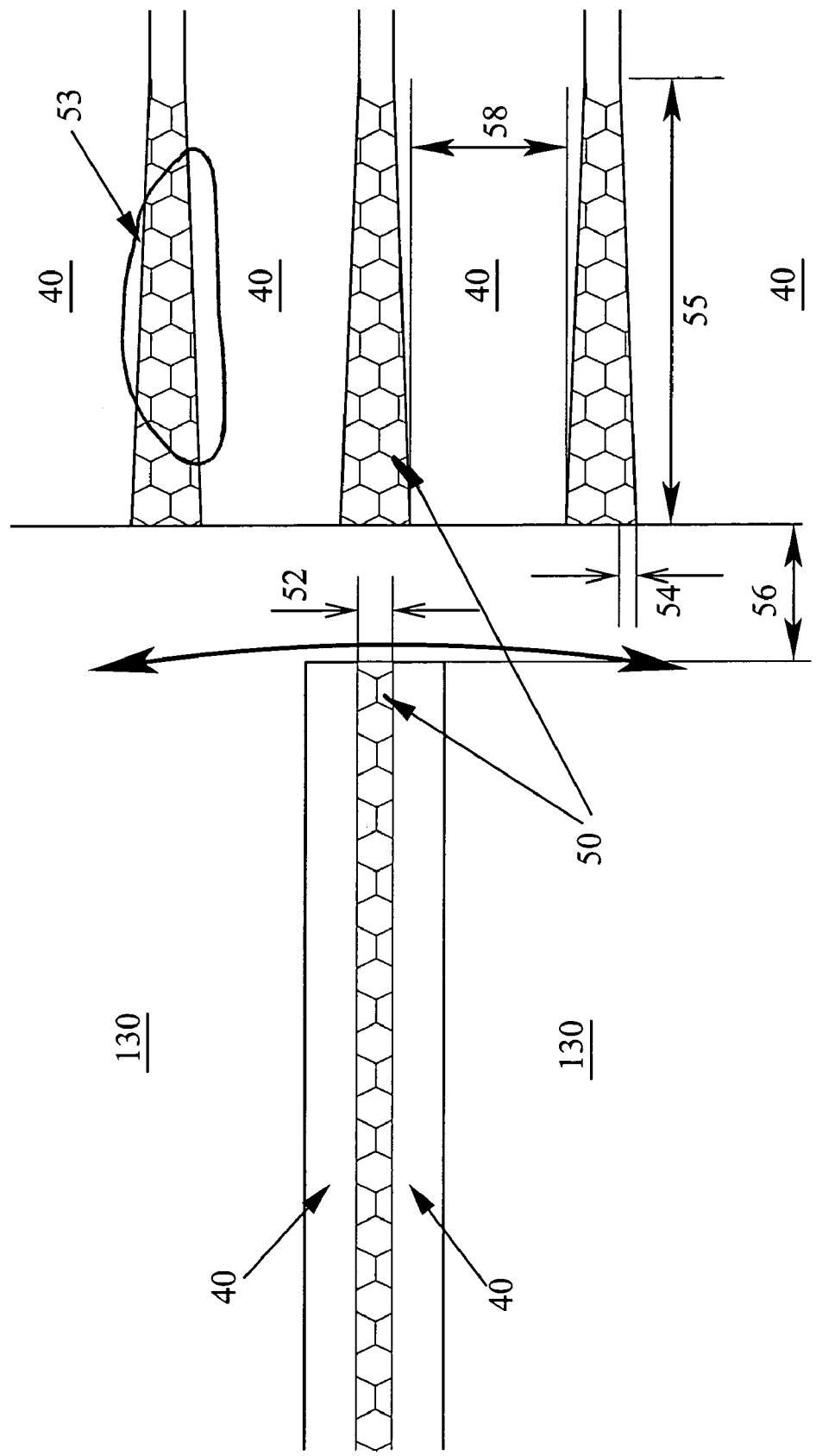
FIG. 5 is a detailed diagrammatic view of MOEM-WS at the interface of input moving waveguide port and fixed output waveguide ports, where the fixed output waveguide ports employs a tapered waveguide to enhance the coupling efficiencies and to reduce requirements for accurate alignment.

The FIG. 5 is a diagrammatic view of tapered optical waveguide 53 geometry (either symmetric or asymmetric tapers) at the receiver waveguide ports 90 on the MOEM-WS. The tapered waveguides 53 at the receiver waveguide ports 90 are lithographically defined and fabricated by using the step shown in FIG. 3E. The MOEM-WS moves the sender waveguide port 80 relative to the multiples of receiver waveguide ports 90. The waveguide core 50 of sender waveguide port 80 is located on top of the moving cantilever flexure 170 with an appropriate waveguide width 52. The sender and receiver waveguide ports 80, 90 are separated by the micromachined free space 130 with an appropriate gap width 56 and the individual waveguide at receiver ports 90 is isolated from the neighboring waveguides with an appropriate channel separation widths 58. The core 50 of tapered waveguide 53 is wider than the ordinary waveguide cores 50 by the taper width 54. The taper length 55, taper width 54, channel separation length 58, waveguide core width 52 of the receiver waveguide ports 90 and micromachined gap width 56 defines the boundary conditions for tapered waveguide 53, which in turn determines the MOEM-WS insertion losses and signal uniformity. The tapered waveguide 53 can reduce insertion losses and promote equalized optical power delivery among the receiver waveguide ports 90. The enlarged waveguide width at the tapered waveguide 53 also reduces the sender waveguide port's 80 alignment requirement for achieving low insertion losses and good signal uniformity. It can result in a drastic reduction on the controller complexity for the MOEM-WS. Note that the integrated nature of MOEM-WS allows the waveguide heights and gap width 56 between the sender and receiver waveguide ports 80, 90 to be precisely pre-aligned and the MOEM-WS can maintain the pre-aligned positions without any further needs for adjustment. Again the moving cantilever flexure 170 provides a side-swinging movement to position and align the sender waveguide port 80 relative to the receiver waveguide ports 90.

The finite-difference beam propagation method (FD-BPM) simulation suggests that it is quite feasible to achieve a low-insertion-loss MOEM-WS using the tapered waveguide 53, which is insensitive to actuator's alignment accuracy. The FD-BPM simulations are performed using a 1550 nm signal wavelength on the micromachined silica glass PLC boundary conditions outlined below. The PLC core has 8 μm×8 μm dimension and the refractive indices for core and cladding are set to be 1.4538 and 1.444 to yield a high-delta of 0.67%. In this boundary condition, the minimum bending radius for a nominal waveguide bending loss becomes 4 to 5 mm. The sender waveguide is a straight waveguide segment on top of the moving cantilever flexure 170 and the receiver waveguide is a tapered waveguide 53 with symmetric tapers. The taper width 54 and taper length 55 are set to be 2 μm and 600 μm respectively. The micromachined gap width 56 (i.e. port separation between the sender and receiver ports) are set from 10 μm to 50 μm with an increment of 10 μm and the neighboring channels at the receiver ports are separated 6 μm apart. The following table summarizes the relationship between micromachined gap width 56 and MOEM-WS coupling efficiency assuming that the sender waveguide port 80 is aligned to the center of tapered receiver waveguide port 90.

| Micromachined Gap Width | Coupling Efficiency of MOEM-WS |
|---|---|
| 10 μm | 97.0% |
| 20 μm | 96.7% |
| 30 μm | 96.3% |
| 40 μm | 95.8% |
| 50 μm | 95.0% |

The relationship between channel separation length 58 and signal crosstalk among channels are summarized in the following table by using the same boundary conditions and the micromachined gap width 56 of 20 μm. This relationship indicates that a nominal channel separation about 6 μm to 8 μm is sufficient enough for good channel isolation with a negligible crosstalk.

| Channel Separation Length | Crosstalk between Channels |
|---|---|
| 4 μm | 7% |
| 6 μm | <0.1% |
| 8 μm | <0.1% |

Figure 6:
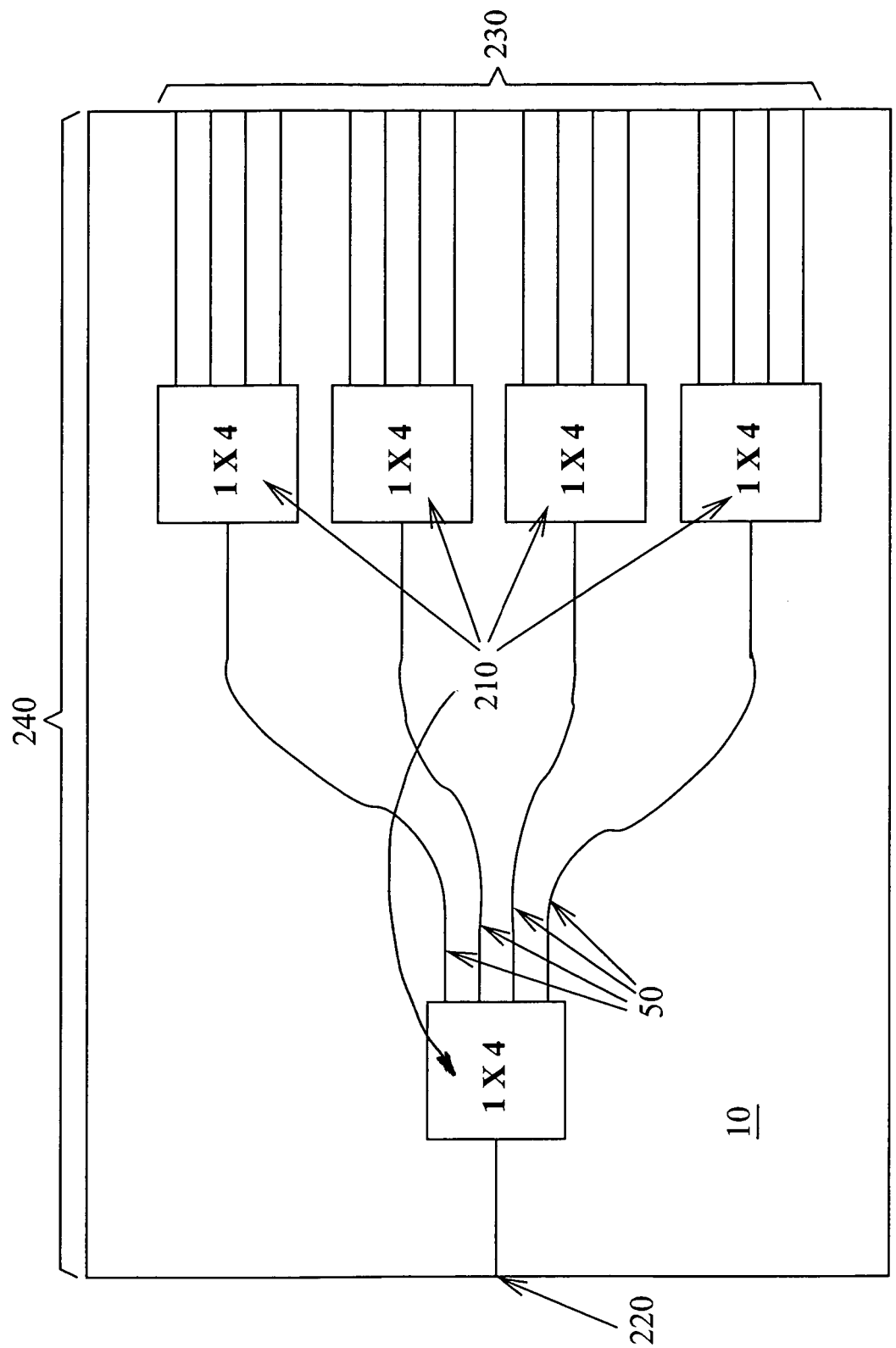
FIG. 6 is a diagrammatic view of cascaded 1×16 MOEM-WS by interconnecting multiples of small-scale 1×4 MOEM-WS on a single substrate.

The FIG. 6 is a diagrammatic view of cascaded 1×16 MOEM-WS 240 by interconnecting multiples of small-scale 1×4 MOEM-WS 210 on a single substrate. The PLC is an integrated optical system and the cascading of PLC components on a single substrate is a quite natural step to expand the scale and functionality of PLCs. In the, FIG. 6, the four output-waveguide-ports out of the first-stage 1×4 MOEM-WS 210 is interconnected to the input-waveguide-ports of the four second-stage 1×4 MOEM-WS 210. The interconnect networks between the first and second-stages of MOEM-WS are smooth waveguide S-bends. The cascaded MOEM-WS shown in FIG. 6 will functionally be viewed as an integrated 1×16 MOEM-WS 240 with one input port 220 and sixteen output ports 230. Within the MOEMS platform the MOEM-WS can easily expand the scale and functionality by cascading and interconnecting multiple PLC devices & components on the same substrate.

It is widely anticipated that, in the near future, the optical cross-connect (OXC) with large port counts will become an essential component for the optical transport networks due to the growing capacity demands in the optical telecommunication. The OXC can be either signal switch in space or signal switch in wavelength involving wavelength converters. Currently the OXC is generally referred to a signal switch in space. Note that it is possible to mix the signal switches in both space and wavelength domains by using the wavelength selective optical cross-connect (WS-OXC). The WS-OXC integrates the OXC's space switching and the wavelength division (de) multiplexers (i.e. WD(D)M) to selectively cross-connect the optical wavelength channels between the input and output ports. For OXC switching, the conventional bulk-optic mechanical switch suffers from large size, large mass, and slow switching time, whereas the moving fiber-to-fiber switch suffers from a expandability limitation in constructing a large-scale fiber switch fabrics due to the difficulties associated with alignment & packaging of discrete optical components. The Micro-Opto-Electro Mechanical cross-connect (MOEM-XC) switch can overcome the obstacles mentioned above and it is capable of providing the low cost, reconfigurable, scalable, low loss low crosstalk, high speed, compact size, and highly reliable OXC.

Figure 7:
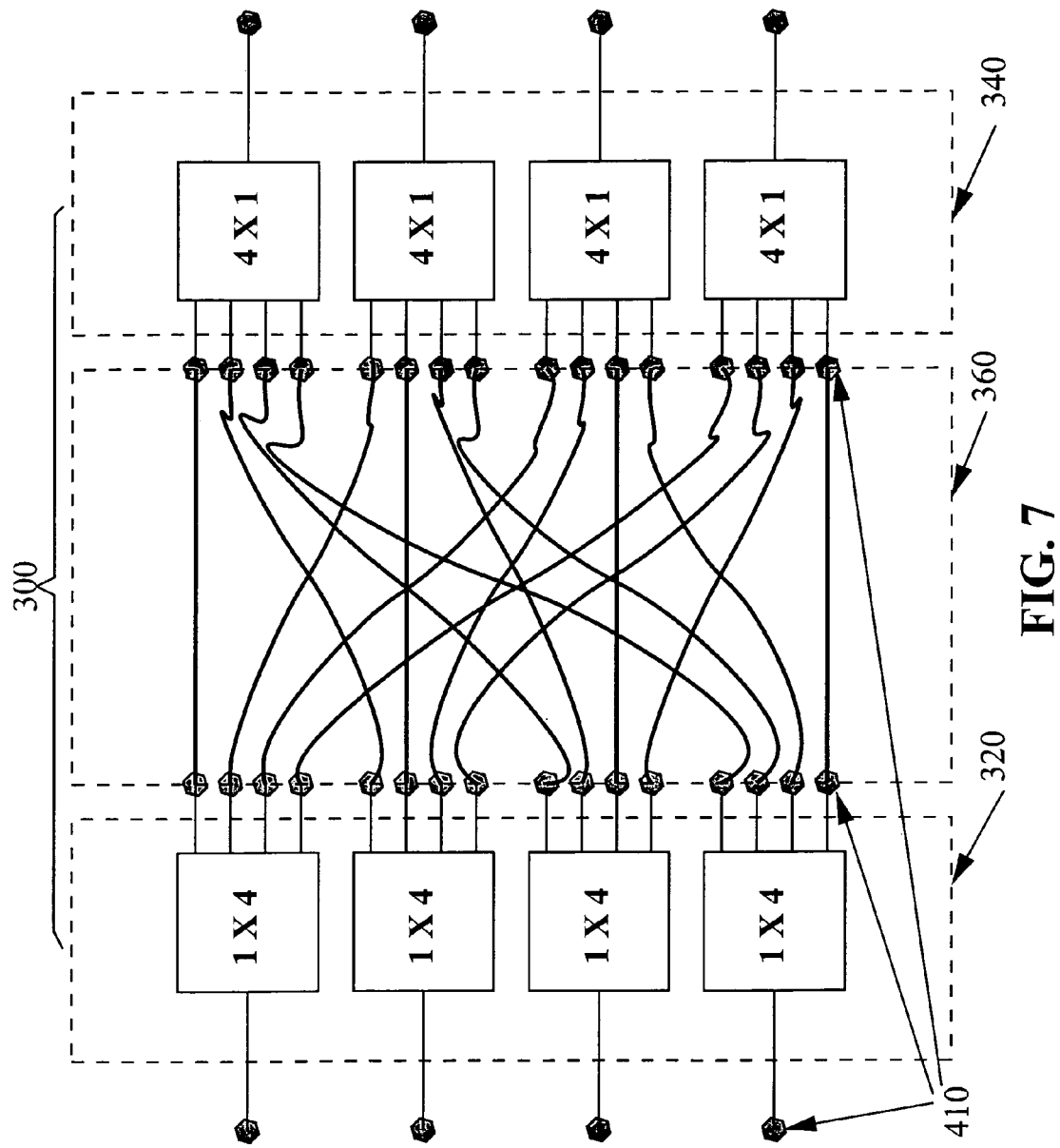
FIG. 7 is a functional block diagram view of MOEM-XC switch employing Spanke architecture, where the 4×4 OXC network comprises input switch array of four 1×4 MOEM-WS, 16×16 fiber transpose block providing a static cross-connect network, and output switch array of four 4×1 MOEM-WS.

The FIG. 7 is a functional block diagram view of MOEM-XC switch 300 employing Spanke architecture, where a 4×4 OXC network is constructed by using three parts: 1) input array of four 1×4 MOEM-WS 320, 2) fiber transpose block 360 providing 16×16 static cross-connect network, and 3) output array of four 4×1 MOEM-WS 340. The MOEM-XC 300 with an arbitrary port count can also be constructed by using M 1×N MOEM-WS 320, fiber transpose block 360 providing M*N-input/M*N-output static cross-connect network, and M N×1 MOEM-WS 340. Here M (number of MOEM-WS) and N (fiber switch port count of individual MOEM-WS) are any positive integer numbers and M is generally equal to N. The Spanke architecture is a strict-sense nonblocking cross-connect architecture, where any unused input ports can be connected to any unused output ports without rerouting the existing connections. This architecture is particularly applicable for a large-scale OXC networks. The fast: actuation time for MOEM-XC 300 makes it suitable for both provisioning and protection switching applications. The arrays of MOEM-WS 320, 340 and fiber transpose block 360 are modular and hierarchical. The interconnection among input array of MOEM-WS 320 fiber transpose block 360, and output array MOEM-WS 340 can be modularly configured by using the optical fibers with various types of fiber connectors 410. It should also be noted that the optical cross-connect switching can be implemented by many other available architecture-es of multistage switch network such as Omega, Clos, dilated Benes, Spanke-Benes, dilated Omega, crossbar, and so on.

Figure 8A:
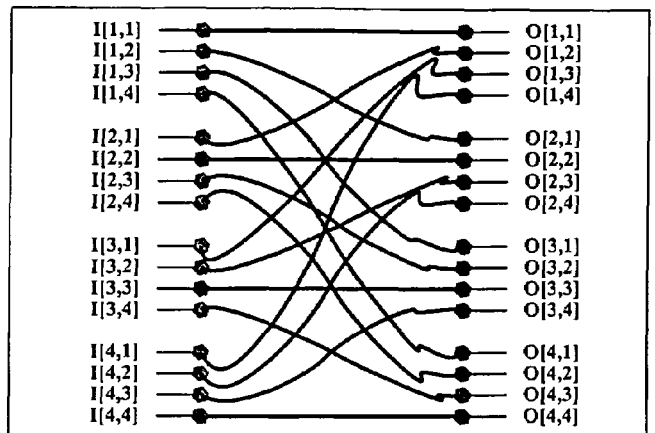
FIG. 8 (comprising FIG. 8A–8B) is a detailed view of 16×16 static cross-connect network of FIG. 7, wherein the fiber transpose block showing detailed device structure and network configuration for the 16×16 static cross-connect network.
Figure 8B:
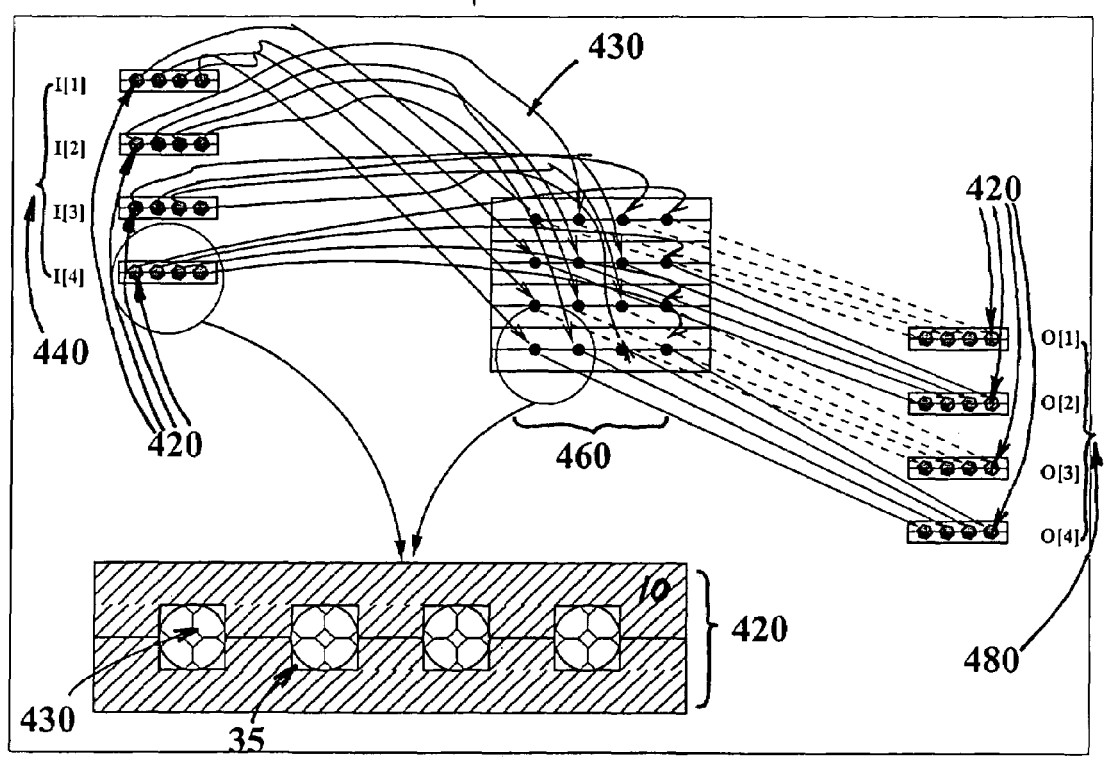

The FIG. 8 (comprising FIG. 8A–8B) is a detailed view of 16×16 static cross-connect network of FIG. 7, wherein the fiber transpose block 360 showing the detailed device structures as well as the network configuration to construct the 16×16 static cross-connect network. The fiber transpose block 360 is composed of M*N-input fiber-to-fiber connector block 440, M*N-output fiber-to-fiber connector block 480, and M*N-input/M*N-output fiber hold block 460. In this example both M and N are 4 by yielding M*N to be 16. The logical interconnect between M*N-input fiber-to-fiber connector block 440 and M*N-output fiber-to-fiber connector block 480 is a fixed static cross-connect. And this logical interconnect is expressed in a matrix notation as shown in FIG. 8A. The ports for M*N-input fiber-to-fiber connector block 440 and M*N-output fiber-to-fiber connector block 480 are indexed using two-dimensional arrays I[x,y] and O[x,y] to form the input matrices I and output matrix O, where the indices x and y are ranging from 1 to 4. The output matrix O is related the input matrix I through the fixed and static cross-connect networks. A careful observation of the cross-connect networks shows that the output matrix O is a matrix transpose of the input matrix I:

$$O = I^T$$

This matrix transpose relation is a foundation for the hierarchical matrix architecture 500 of fiber transpose blocks shown in FIG. 9 and it allows a way to construct large-scale MOEM-XC switches.

The FIG. 8B shows a detailed device structure for the fiber transpose block 360. The ribbon connectors 420 holding arrays of optical fibers 430 can be constructed by placing and bonding the fibers 430 between the silicon microgrooves 35. The end facet of ribbon connectors 420 containing optical fibers 430 will be polished to improve the optical coupling efficiency. A mating ribbon connector receptacle can also be constructed by using the similar silicon microstructures. Then the arrays of optical fibers 430 can interface with each other by joining the ribbon connectors 420 to the mating ribbon connector receptacles. In FIG. 8B, the optical fiber cross-connects between input ribbon connectors 420 and fiber-hold block 460 provides a fixed and static cross-connect network. Alternatively, the optical fiber cross-connects can be placed between the fiber-hold block 460 and the output ribbon connectors 420. The fiber-hold block 460 utilizes a stacked silicon microgrooves 35 to organize multiples of the optical fibers 430.

The FIG. 9 (comprising FIG. 9A–9C) is a view of hierarchical matrix architecture 500 of fiber transpose blocks 360 to construct a large-scale MOEM-XC switch. It illustrates that a large-scale 64×64 fiber transpose block 360 can be constructed by hierarchically interconnecting 16 units of each input fiber-to-fiber connector block 440, fiber-support block 460, and Output fiber-to-fiber connector block 480 of 16×16 fiber transpose block. The hierarchical matrix architecture 500 of fiber transpose blocks 360 efficiently utilizes the matrix transpose relationship between the input and output fiber-to-fiber connector blocks 440, 480. In the matrix algebra, the transpose of large matrix A can be implemented by hierarchically transposing the sub-matrices of A. For example, let a matrix A with a N-by-N matrix size be divided into four equal-sized sub-matrices (i.e. A__11, A__12, A__21, and A__22) such that sub-matrices have the same matrix size of N/2-by-N/2. The transpose of matrix A can be obtained by transposing sub-matrices (i.e. replacing A__12 with A__21), wherein all sub-matrices are also recursively transposed within itself too. The FIG. 9A is a view of the fiber transpose block 360 and the FIG. 9B shows the symbolic notations for input fiber-to-fiber connector block 440, output fiber-to-fiber connector block 480, input/output fiber-hold block 460, and fiber bundles 530. The FIG. 9C shows the large-scale 64×64 fiber transpose block being constructed by hierarchically interconnecting 16 units of each input fiber-to-fiber connector block 440, fiber-support block 460, and output fiber-to-fiber block 480 of 16×16 fiber transpose block. The hierarchical matrix architecture 500 is composed of three groups of matrices: 1) input ribbon connector block matrix 540, 2) output ribbon connector block matrix 580, and 3) fiber-hold block matrix 560. The matrix elements 550, 5670, 590 for these matrices 540, 580, 560 are input fiber-to-fiber connector block 440, output fiber-to-fiber connector block 480, and fiber-hold block 460 of FIGS. 9A and 9B. The cross-connects of optical fiber bundle, which are placed between input fiber-to-fiber connector block 440 and fiber-hold block 460, form a fixed and static cross-connect networks. This fixed and static cross-connects of optical fibers can easily become an implementation bottleneck for the large-scale OXC employing the Spanke architecture, since the number of optical fibers used in the cross-connects for the Spanke architecture grows at a square of its port counts. For example, 1024-port Spanke architecture OXC will require an optical fiber cross-connect network composed of 1024*1024 individual optical fibers and the handling of million optical fibers can easily become a daunting task. However the hierarchical matrix architecture 500 shown in FIG. 9 allows an efficient way to expand the fiber transpose block 360 to a large one in a modular and hierarchical manner.

Figure 10:
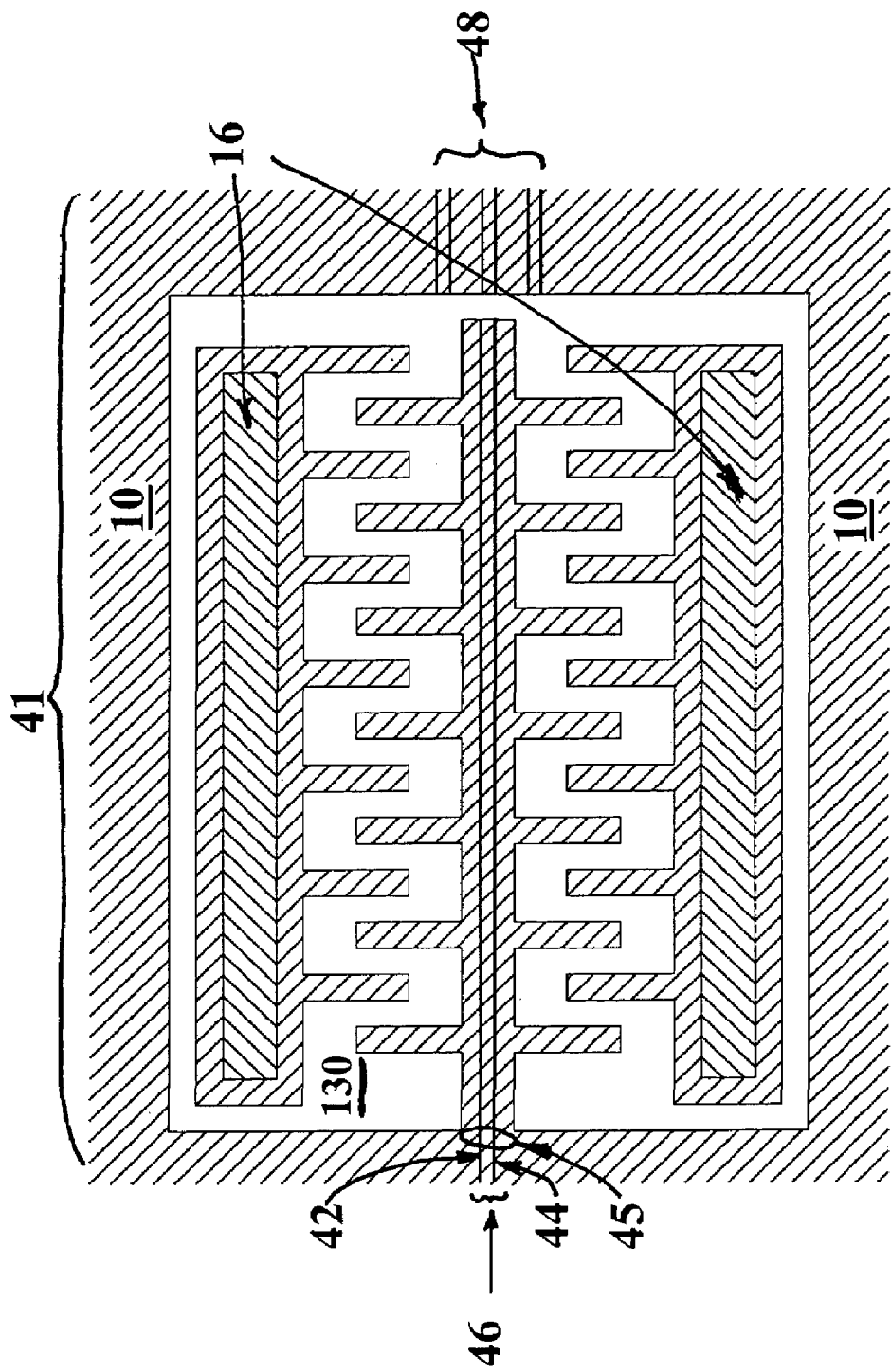
FIG. 10 is a diagrammatic view of full-duplex fiber switch using MOEM-WS, showing a pair of waveguide channels at both input and output waveguide.

The FIG. 10 is a diagrammatic view of full-duplex fiber switch 41 using MOEM-WS, showing a pail of waveguide channels at both input and output waveguide 46, 48. The full-duplex fiber switch 41 has a dual-channel waveguides 45 at both ports of sender and receiver waveguides 80, 90. The dual-channel waveguide 45 is composed of one forward channel waveguide 42 and one backward channel waveguide 44. It supports concurrent signal propagation in both forward and backward directions in order to allow bi-directional and full-duplex signal transmissions. The moving cantilever flexure 170, containing input dual-channel waveguides 46, moves and aligns its position relative to the multiples of output dual-channel waveguide ports 48. Note that the alignment of forward channel waveguide 42 on full-duplex fiber switch 41 coincides with that of the backward channel waveguide 44.

Figure 11A:
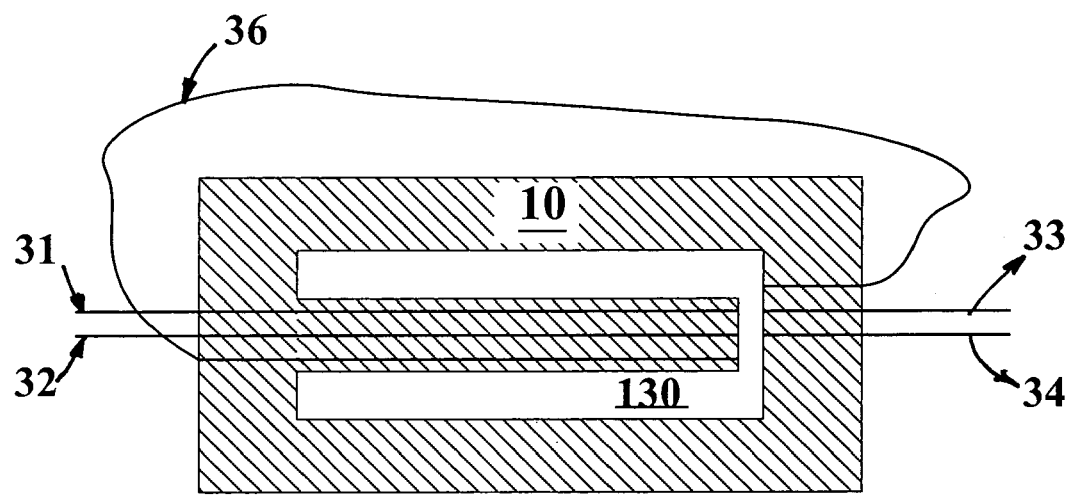
FIG. 11 (comprising FIG. 11A–11B) is a diagrammatic view of 2-input/2-output crossbar fiber switch using MOEM-WS, showing both "bar" and "cross" states of the crossbar switch.
Figure 11B:
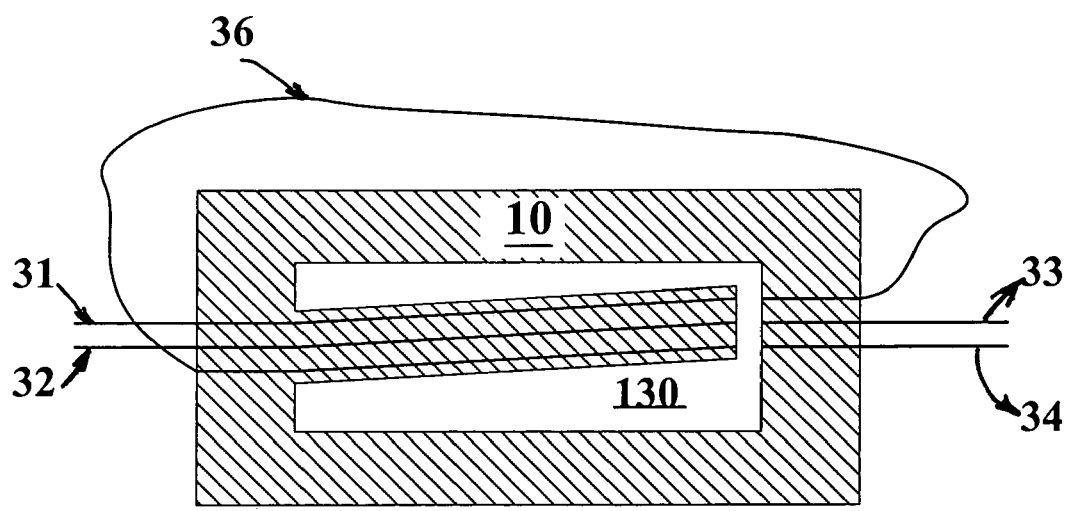

The FIG. 11 (comprising FIG. 11A–11B) is a diagrammatic view of 2-input/2-output crossbar fiber switch 30 using MOEM-WS, showing both "bar" and "cross" state configurations of the crossbar switch. The 2-input/2-output crossbar fiber switch 30 has three waveguide channels at both sender and receiver waveguide ports. On the input side of the crossbar fiber switch 30, the signal-input-1 channel 31, signal-input-2 channel 32, and feedback-loop channel 36 become the upper, middle, and lower channels respectively at the sender ports 80 on moving cantilever flexure 170. On the output side of the crossbar fiber switch 30, the upper, middle, and lower channels at the receiver ports 90 become the feedback-loop channel 36, signal-output-1 channel 33, and signal-output-2 channel 34 respectively. In the 2-input/2-output crossbar fiber switch 30 configuration, the upper channel of the receiver port 90 is looped back to the lower channel of the sender port 80. The moving cantilever flexure 170, containing three waveguide channels 31, 32, 36, moves and aligns its position relative to the output waveguide channels 33, 34, 36. The FIG. 10A shows the "bar" state of the crossbar switch 30. In FIG. 10A, the signal-input-1 channel 31 and signal-input-2 channel 32 are aligned to the signal-output-1 channel 33 and signal-output-2 channel 34 respectively, while the feedback loop channel 36 is connected to any input channels. The FIG. 10B shows the "cross" state of the crossbar switch. The movement of moving cantilever flexure 170 can align the signal-input-1 channel 31, signal-input-2 channel 32, and feedback-loop channel 36 of the sender port 80 to the feedback-loop channel 36, signal-output-1 channel 33, and signal-output-2 channel 34 of the receiver port 90 respectively. As a result, the signal-output-1 and signal-output-2 channels 31, 32 are cross-connected to the signal-input-2 and signal-input-1 channels 33, 34 through the aid of feedback loop) channel 36. The feedback loop channel 36 can be implemented using discrete optical fibers 430 or integrated waveguides on the micromachined PLC substrate 100.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

The invention claimed is:

1. A Micro-Opto-Electro-Mechanical Waveguide Switch (MOEM-WS) comprising:
a micromachined planar lightwave circuit (PLC) substrate having at least one integrated optical waveguide fabricated thereto and at least one optical fiber coupled into the integrated optical waveguide, wherein said micromachined PLC substrate comprising a silicon-on-insulator (SOI) wafer; and
a micro electromechanical actuator on the micromachined PLC substrate to move and align sender waveguide ports relative to a plurality of receiver waveguide ports.

2. The MOEM-WS as cited in claim 1, providing 1-input/N-output (1×N) fiber switching or N-input/1-output (N×1) fiber switching, wherein the port number N being any positive integer numbers and being determined by the number of waveguide ports on the said micromachined PLC.

3. The MOEM-WS as cited in claim 1, wherein said integrated optical waveguide supporting a single or a plurality of electromagnetic wave propagation modes along the waveguide and said integrated optical waveguide comprising a core and adjacent cladding composed of silica glass, polymer, SiON, silicon, or any other optical waveguide materials for electromagnetic wave propagation.

4. The MOEM-WS as cited in claim 1, further comprises a single or a plurality of electrically conductive pathways on said micromachined PLC substrate or said support substrate.

5. The MOEM-WS as cited in claim 1, further comprising photonic or electronic integrated circuits mounted on said micromachined PLC substrate for optical signal generation/detection or subsequent electronic signal processing.

6. The MOEM-WS as cited in claim 1, wherein said micro electromechanical actuator comprising a single or a plurality of moving cantilever flexures, upon which sender or receiver waveguide ports reside, and said micro electromechanical actuator providing a horizontal movement of the sender or receiver waveguide ports relative to the other waveguide ports on the opposite side, wherein the horizontal movement being either linear or angular displacement.

7. The MOEM-WS as cited in claim 1, wherein said micro electromechanical actuator utilizing a variety of MEMS side actuation mechanisms including electrostatic, magnetic, thermal, shape memory alloy, impact, piezoelectric actuations, or any other applicable MEMS actuation methods.

8. The MOEM-WS as cited in claim 1, wherein said micromachined PLC having silicon microgrooves filled with the a material substantially similar to said integrated optical waveguide in order to avoid the peeling between integrated optical waveguide layer and the silicon structure layer.

9. The MOEM-WS as cited in claim 1, wherein said micromachined PLC having tapered waveguide ports to increase the optical signal coupling efficiency and to reduce the alignment accuracy requirements between the movable waveguide port relative to the other waveguide ports on the opposite side, wherein, the tapered waveguide ports being either symmetric or asymmetric.

10. The MOEM-WS as cited in claim 1, providing a cascaded fiber switch array to expand the scale and functionality of MOEM-WS, wherein a large-scale cascaded fiber switch array comprising a plurality of serially interconnected small-scale fiber switch arrays on a single substrate.

11. The MOEM-WS as cited in claim 1, wherein said micromachined PLC comprising a single or a plurality of optical waveguides at both ports of sender and receiver waveguides for concurrent forward, backward, bi-directional, or full-duplex signal transmissions.

12. The MOEM-WS as cited in claim 1, providing a 2-input/2-output crossbar fiber switch, wherein said micromachined PLC comprising three waveguide channels at both sender and receiver waveguide ports, and further wherein, one of the receiver waveguide port being looped back into the appropriate sender waveguide port in order to construct "bar" and "cross" states.

13. The MOEM-WS as cited in claim 1, providing fiber to waveguide optical switch, wherein said micro electromechanical actuator to move and align a single or a plurality of optical fibers relative to a single or a plurality of said integrated optical waveguide.

14. The MOEM-WS as cited in claim 1, said integrated optical wavguide or said optical fiber being coated with antireflection films, and further wherein, a space between waveguide ports being filled with air, inert gas, or index-matching fluid.

15. The MOEM-WS as cited in claim 1, wherein said integrated optical waveguide further comprising a single or a plurality of tilted waveguide end facet in order to reduce back-reflections, and further wherein, said sender waveguide ports being properly shifted relative to said receiver waveguide ports to compensate offsets or displacements of transmitted signal from said tilted waveguide end facet.

16. A Micro-Opto-Electro-Mechanical Waveguide Switch (MOEM-WS) comprising:
a micromachined planar lightwave circuit (PLC) substrate having at least one integrated optical waveguide fabricated thereto and at least one optical fiber coupled into the integrated optical waveguide;
a micro electromechanical actuator on the micromachined PLC substrate to move and align sender waveguide ports relative to a plurality of receiver waveguide ports; and
a support substrate, wherein said support substrate being donded to said micromachined PLC substrate.

17. The MOEM-WS as cited in claim 16, providing 1-input/N-output (1×N) fiber switching or N-input/1-output (N×1) fiber switching, wherein the port number N being any positive integer numbers and being determined by the number of waveguide ports on the said micromachined PLC.

18. The MOEM-WS as cited in claim 16, wherein said integrated optical waveguide supporting a single or a plurality of electromagnetic wave propagation modes along the waveguide and said integrated optical waveguide comprising a core and adjacent cladding composed of silica glass, polymer, SiON, silicon, or any other optical waveguide materials for electromagnetic wave propagation.

19. The MOEM-WS as cited in claim 16, further comprises a single or a plurality of electrically conductive pathways on said micromachined PLC substrate or said support substrate.

20. The MOEM-WS as cited in claim 16, further comprising photonic or electronic integrated circuits mounted on said micromachined PLC substrate for optical signal generation/detection or subsequent electronic signal processing.

21. The MOEM-WS as cited in claim 16, wherein said micro electromechanical actuator comprising a single or a plurality of moving cantilever flexures, upon which sender or receiver waveguide ports reside, and said micro electromechanical actuator providing a horizontal movement of the sender or receiver waveguide ports relative to the other waveguide ports on the opposite side, wherein the horizontal movement being either linear or angular displacement.

22. The MOBM-WS as cited in claim 16, wherein said micro electromechanical actuator utilizing a variety of MEMS side actuation mechanisms including electrostatic, magnetic, thermal, shape memory alloy, impact, piezoelectric actuations, or any other applicable MEMS actuation methods.

23. The MOEM-WS as cited in claim 16, wherein said micromachined PLC having silicon microgrooves filled with a material substantially similar to said integrated optical waveguide in order to avoid the peeling between integrated optical waveguide layer and the silicon structure layer.

24. The MOEM-WS as cited in claim 16, wherein said micromachined PLC having tapered waveguide ports to increase the optical signal coupling efficiency and to reduce the alignment accuracy requirements between the movable waveguide port relative to the other waveguide ports on the opposite side, wherein, the tapered waveguide ports being either symmetric or asymmetric.

25. The MOEM-WS as cited in claim 16, providing a cascaded fiber switch array to expand the scale and functionality of MOEM-WS, wherein a large-scale cascaded fiber switch array comprising a plurality of serially interconnected small-scale fiber switch arrays on a single substrate.

26. The MOEM-WS as cited in claim 16, wherein said micromachined PLC comprising a single or a plurality of optical waveguides at both ports of sender and receiver waveguides for concurrent forward, backward, bi-directional, or full-duplex signal transmissions.

27. The MOEM-WS as cited in claim 16, providing a 2-input/2-output crossbar fiber switch, wherein said micromachined PLC comprising three waveguide channels at both sender and receiver waveguide ports, and further wherein, one of the receiver waveguide port being looped back into the appropriate sender waveguide port in order to construct "bar" and "cross" states.

28. The MOEM-WS as cited in claim 16, providing fiber to waveguide optical switch, wherein said micro electromechanical actuator to move and align a single or a plurality of optical fibers relative to a single or a plurality of said integrated optical waveguide.

29. The MOEM-WS as cited in claim 16, said integrated optical wavguide or said optical fiber being coated with antireflection films, and further wherein, a space between waveguide ports being filled with air, inert gas, or index-matching fluid.

30. The MOEM-WS as cited in claim 16, wherein said integrated optical waveguide further comprising a single or a plurality of tilted waveguide end facet in order to reduce back-reflections, and further wherein, said sender waveguide ports being properly shifted relative to said receiver waveguide ports to compensate offsets or displacements of transmitted signal from said tilted waveguide end facet.

* * * * *